US009069716B2

(12) United States Patent
Ge et al.

(10) Patent No.: US 9,069,716 B2
(45) Date of Patent: Jun. 30, 2015

(54) MATRIX CALCULATION UNIT

(71) Applicants: FUJITSU LIMITED, Kawasaki-shi, Kanagawa (JP); FUJITSU SEMICONDUCTOR LIMITED, Yokohama-shi, Kanagawa (JP)

(72) Inventors: Yi Ge, Bunkyo (JP); Hiroshi Hatano, Kawasaki (JP); Kazuo Horio, Yokohama (JP)

(73) Assignees: FUJITSU LIMITED, Kawasaki (JP); SOCIONEXT INC., Yokohama (JP)

( * ) Notice: Subject to any disclaimer, the term of this patent is extended or adjusted under 35 U.S.C. 154(b) by 259 days.

(21) Appl. No.: 13/778,843

(22) Filed: Feb. 27, 2013

(65) Prior Publication Data

US 2013/0262548 A1    Oct. 3, 2013

(30) Foreign Application Priority Data

Mar. 27, 2012  (JP) ................................ 2012-072237

(51) Int. Cl.
*G06F 7/32*    (2006.01)
*G06F 7/52*    (2006.01)
*G06F 17/16*   (2006.01)

(52) U.S. Cl.
CPC . *G06F 17/16* (2013.01); *G06F 7/52* (2013.01)

(58) Field of Classification Search
CPC . G06F 17/16; G06F 15/8076; G06F 15/8092; G06F 7/4806; G06F 9/30036

USPC ......................................... 708/520, 514, 607
See application file for complete search history.

(56) References Cited

U.S. PATENT DOCUMENTS

| 6,105,114 A | 8/2000 | Okuno |
| 7,836,118 B1 * | 11/2010 | Juffa et al. ................... 708/607 |
| 2003/0088600 A1 * | 5/2003 | Lao et al. ...................... 708/520 |

FOREIGN PATENT DOCUMENTS

JP        10-207868        8/1998

OTHER PUBLICATIONS

Patent Abstracts of Japan, Publication No. 10-207868, Published Aug. 7, 1998.

* cited by examiner

*Primary Examiner* — Tan V. Mai
(74) *Attorney, Agent, or Firm* — Staas & Halsey LLP

(57) ABSTRACT

A matrix calculation unit may include a matrix operation unit and a converting unit. The matrix operation unit may include functions to perform a matrix operation of a first size with respect to data stored in a memory, and to perform a matrix operation of a second size with respect to the data stored in the memory, where the second size is enlarged from the first size. The converting unit may convert in at least one direction in the memory between a data array suited for the matrix operation of the first size and a data array suited for the matrix operation of the second size.

8 Claims, 27 Drawing Sheets

FIG.11

DATA: (1), (2), (3), (4), (5), (6), (7), (8), (9), (10), (11), (12), (13), (14), (15), (16)

$$4 \times 4 \text{ MATRIX} = \begin{pmatrix} (1) & (2) & (3) & (4) \\ (5) & (6) & (7) & (8) \\ (9) & (10) & (11) & (12) \\ (13) & (14) & (15) & (16) \end{pmatrix}$$

FIG.12

DATA: (1), (2), (3), (4), (5), (6), (7), (8), (9), (10), (11), (12), (13), (14), (15), (16)

$$4 \times 4 \text{ MATRIX} = \begin{pmatrix} (1) & (2) & (5) & (6) \\ (3) & (4) & (7) & (8) \\ (9) & (10) & (13) & (14) \\ (11) & (12) & (15) & (16) \end{pmatrix}$$

FIG.13

| | BANK 0 | | | | BANKS 1 & 2 | BANK 3 | | | | |
|---|---|---|---|---|---|---|---|---|---|---|
| | A0 | | | | ~ | AN-1 | | | | SOURCE (1) (4×4) |
| | B0 | | | | ~ | BN-1 | | | | SOURCE (2) (4×4) |
| | C0 | | | | ~ | CN-1 | | | | DESTINATION (4×4) |
| c0 | c1 | c2 | c3 | | ~ | $c_{N-4}$ | $c_{N-3}$ | $c_{N-2}$ | $c_{N-1}$ | |
| b0 | b1 | b2 | b3 | | ~ | $b_{N-4}$ | $b_{N-3}$ | $b_{N-2}$ | $b_{N-1}$ | SOURCE (1) (2×2) |
| a0 | a1 | a2 | a3 | | ~ | $a_{N-4}$ | $a_{N-3}$ | $a_{N-2}$ | $a_{N-1}$ | |
| d0 | d1 | d2 | d3 | | ~ | $d_{N-4}$ | $d_{N-3}$ | $d_{N-2}$ | $d_{N-1}$ | |
| e0 | e1 | e2 | e3 | | ~ | $e_{N-4}$ | $e_{N-3}$ | $e_{N-2}$ | $e_{N-1}$ | |
| f0 | f1 | f2 | f3 | | ~ | $f_{N-4}$ | $f_{N-3}$ | $f_{N-2}$ | $f_{N-1}$ | SOURCE (2) (2×2) |
| g0 | g1 | g2 | g3 | | ~ | $g_{N-4}$ | $g_{N-3}$ | $g_{N-2}$ | $g_{N-1}$ | |
| h0 | h1 | h2 | h3 | | ~ | $h_{N-4}$ | $h_{N-3}$ | $h_{N-2}$ | $h_{N-1}$ | |
| i0 | i1 | i2 | i3 | | ~ | $i_{N-4}$ | $i_{N-3}$ | $i_{N-2}$ | $i_{N-1}$ | |
| j0 | j1 | j2 | j3 | | ~ | $j_{N-4}$ | $j_{N-3}$ | $j_{N-2}$ | $j_{N-1}$ | DESTINATION (2×2) |
| k0 | k1 | k2 | k3 | | ~ | $k_{N-4}$ | $k_{N-3}$ | $k_{N-2}$ | $k_{N-1}$ | |
| l0 | l1 | l2 | l3 | | ~ | $l_{N-4}$ | $l_{N-3}$ | $l_{N-2}$ | $l_{N-1}$ | |
| | | | | | ... | | | | | |

134

MATRIX CALCULATION UNIT

CROSS-REFERENCE TO RELATED APPLICATIONS

This application is based upon and claims the benefit of priority of the prior Japanese Patent Application No. 2012-072237, filed on Mar. 27, 2012, the entire contents of which are incorporated herein by reference.

FIELD

The embodiments discussed herein are related to matrix calculation units.

BACKGROUND

Conventionally, in a baseband processing of radio communication and the like, a large amount of matrix calculation process may be required. When subjecting a large amount of data to the same matrix calculation process, a stream arithmetic processing unit (APU) may be suitably used to consecutively read a series of data from a memory, and write a series of calculation results to consecutive addresses of the memory.

A two-dimensional array transposition circuit related to the matrix and the memory is known. In the two-dimensional array transposition circuit, an address conversion circuit may perform a first control operation to specify a row address by lower bits of an address signal and to specify a column address by upper bits of the address signal. In addition, the address conversion circuit may perform a second control operation to specify the row address by upper bits of the address signal, and to specify the column address by lower bits of the address signal. The two-dimensional array transposition circuit performs the control operation of either one of the first control operation and the second control operation, in order to perform a transpose and read of two-dimensional array data written in the memory.

An example of the two-dimensional array transposition circuit is proposed in a Japanese Laid-Open Patent Publication No. 10-207868, for example.

In the case of a processor that performs a stream process by accessing a large amount of data at consecutive addresses of the memory, a processing performance may greatly deteriorate when the data are not arranged at consecutive addresses.

However, in the case of a processor that performs a 2×2 matrix calculation and a 4×4 matrix calculation, for example, a result of the 2×2 matrix calculation may be stored in the memory with a format suited for processes targeting the 2×2 matrix calculation. In this case, when the result of the 2×2 matrix calculation is to be used for processes targeting the 4×4 matrix calculation, the processes targeting the 4×4 matrix calculation may be difficult to perform efficiently because the result of the 2×2 matrix calculation may be unsuited for the 4×4 matrix calculation. Similarly, when the result of the 4×4 matrix calculation is to be used for processes targeting the 2×2 matrix calculation, the processes targeting the 2×2 matrix calculation may be difficult to perform efficiently because the result of the 4×4 matrix calculation may be unsuited for the 2×2 matrix calculation.

The conventional two-dimensional array transposition circuit described above may simply perform the transpose and read of the two-dimensional array data written in the memory. For this reason, the arrangement of the data with formats suited for the matrix calculations of different matrix sizes may be difficult to achieve.

SUMMARY

Accordingly, it is an object in one aspect of the embodiment to provide a matrix calculation unit that may efficiently perform the matrix calculation.

According to one aspect of the present invention, a matrix calculation unit may include a matrix operation unit including a function to perform a matrix operation of a first size with respect to data stored in a memory, and a function to perform a matrix operation of a second size with respect to the data stored in the memory, wherein the second size is enlarged from the first size; and a converting unit configured to convert in at least one direction in the memory between a data array suited for the matrix operation of the first size and a data array suited for the matrix operation of the second size.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating a general rule to interpret the 4×4 matrix from data stored in a memory;

FIG. 12 is a diagram illustrating a rule employed by a control circuit in the first embodiment to interpret the 4×4 matrix from data stored in a data memory;

FIG. 13 is a diagram illustrating a data array in which sources of 2×2 matrices to be calculated in parallel are not stored on the same line in the data memory;

DESCRIPTION OF EMBODIMENTS

Preferred embodiments of the present invention will be described with reference to the accompanying drawings.

A description will now be given of the matrix calculation unit in each embodiment according to the present invention.

First Embodiment

A description will be given of a matrix calculation unit 1 in a first embodiment of the present invention, by referring to FIGS. 1 through 23.

Application Example

Figure 1:
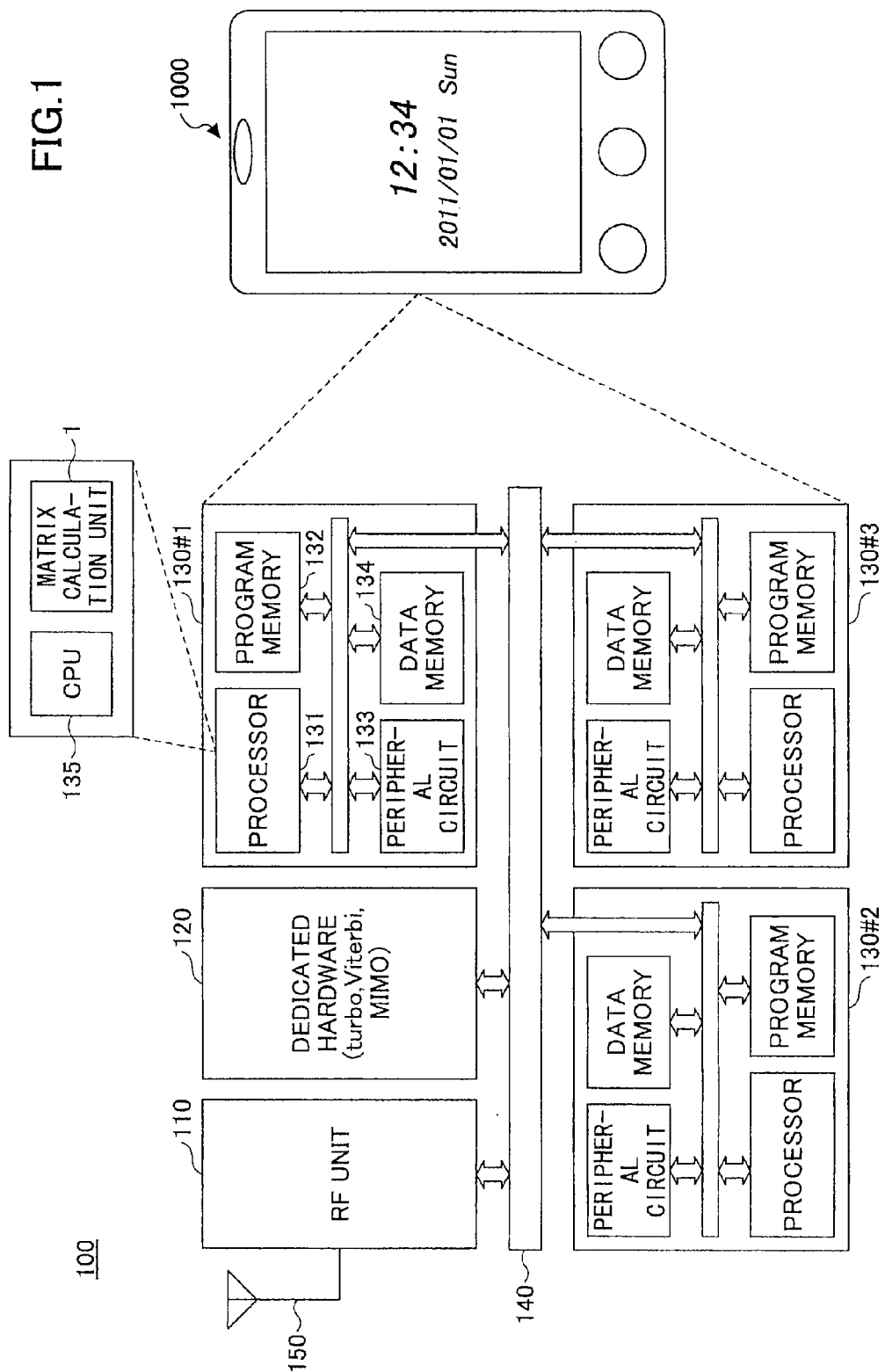
FIG. 1 is a diagram illustrating an application in which a matrix calculation unit in a first embodiment of the present invention is applied to a baseband processing LSI of a mobile phone.

FIG. 1 is a diagram illustrating an application in which a matrix calculation unit 1 in a first embodiment of the present invention is applied to a baseband processing LSI (Large Scale Integrated circuit) 100 of a mobile phone (or cellular phone) 1000. The baseband processing LSI 100 may include an RF (Radio Frequency) unit 110, dedicated hardware 120, and DSPs (Digital Signal Processors) 130#1 through 130#3.

The RF unit 110 may down-convert the frequency of a radio signal received via an antenna 150, convert the down-converted radio signal into a digital signal, and output the digital signal to a bus 140. In addition, the RF unit 110 may convert the digital signal received from the bus 140 into an analog signal, up-convert the frequency of the analog signal into the radio frequency, and output the up-converted analog signal via the antenna 150.

For example, the dedicated hardware 120 may include a turbo part to process error correction codes, a Viterbi part to execute a Viterbi algorithm, and a MIMO (Multiple-Input and Multiple-Output) part to transmit and receive data via a plurality of antennas.

In the following description, each of the DSPs 130#1 through 130#3 may generally be referred to as the "DSP 130". The DSP 130 may include a processor 131, a program memory 132, a peripheral circuit 133, and a data memory 134. The processor 131 may include a CPU (Central Processing Unit) 135, and the matrix calculation unit 1 of this embodiment. Each element process of a radio communication signal processing to be performed by a searcher (sync), a demodulator, a decoder, a codec, a modulator, and the like, may be assigned to each DSP 130.

Next, a description will be given of a use of the LSI 100. In a case in which the mobile phone 1000 performs the baseband processing according to a single radio communication system, the entire mobile phone 1000 may be formed by dedicated hardware. However, when the baseband processing according to the LTE (Long Term Evolution) and the W-CDMA (Wideband Code Division Multiple Access) are to be performed on the same hardware, programmable hardware such as the DSP 130 may be required.

Figure 2:
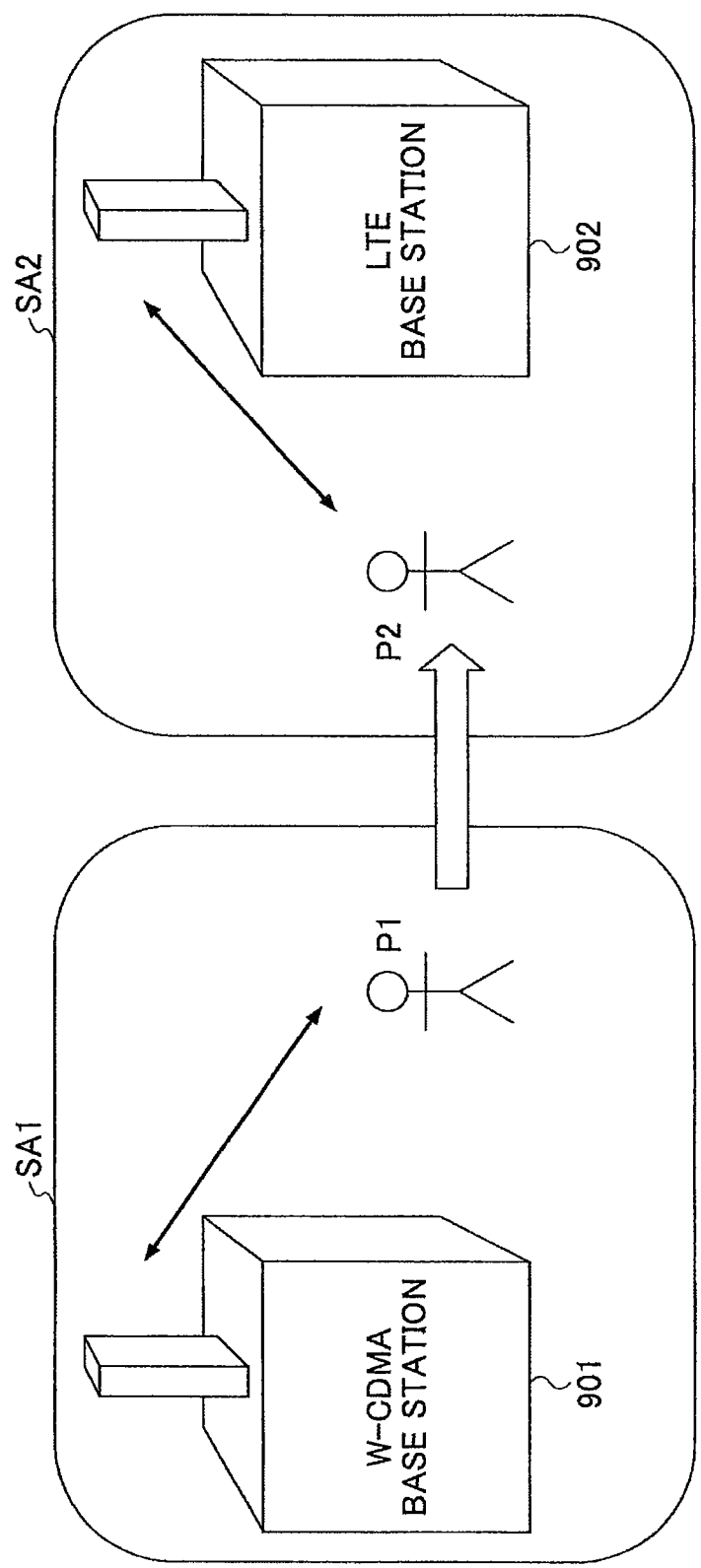
FIG. 2 is a diagram illustrating a state in which the mobile phone moves between an LTE area and a W-CDMA area.

FIG. 2 is a diagram illustrating a state in which the mobile phone 1000 moves between an LTE area and a W-CDMA area. In this case, the mobile phone 1000 may switch the radio communication system by simply modifying software. In FIG. 2, a W-CDMA base station 901 provides a W-CDMA area SA1 as the coverage area thereof, and an LTE base station 902 provide an LTE area SA2 as the coverage area thereof. When a user carrying the mobile phone 1000 is located at a position P1 within the W-CDMA area SA1, firmware for the W-CDMA communication system may be used for the radio communication. On the other hand, when the user carrying the mobile phone 1000 is located at a position P2 within the LTE area SA2, the firmware for the LTE communication system may be used for the radio communication.

Figure 3:
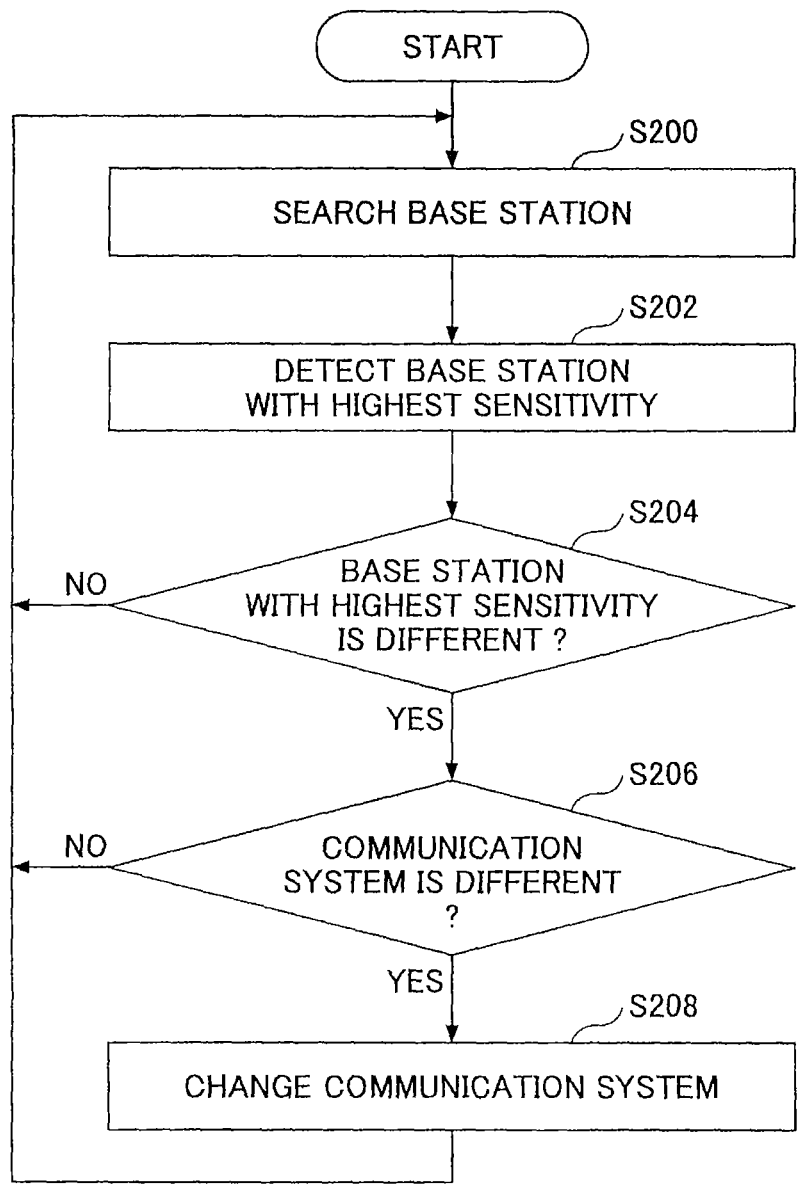
FIG. 3 is a flow chart illustrating an example of a process executed by the mobile phone capable of switching communication systems.

FIG. 3 is a flow chart illustrating an example of a process executed by the mobile phone 1000 capable of switching communication systems. First, the mobile phone 1000 searches base stations (step S200), and detects the base station with a highest sensitivity (step S202). Next, the mobile phone 1000 judges whether the base station with the highest sensitivity is different from the base station with which the mobile phone 1000 is currently communicating (S204). When the base station with the highest sensitivity is different from the base station with which the mobile phone 1000 is currently communicating (YES in step S204), the mobile phone 1000 judges whether the base station with the highest sensitivity employs a communication system different from that employed by the base station with which the mobile phone 1000 is currently communicating (step S206). When the base station with the highest sensitivity employs the communication system different from that employed by the base station with which the mobile phone 1000 is currently communicating (YES in step S206), the mobile telephone 1000 changes the communication system employed thereby (step S208). The process returns to step S200 when the judgement result of step S204 or S206 is NO, and also after step S208.

Matrix Calculation Unit

Figure 4:
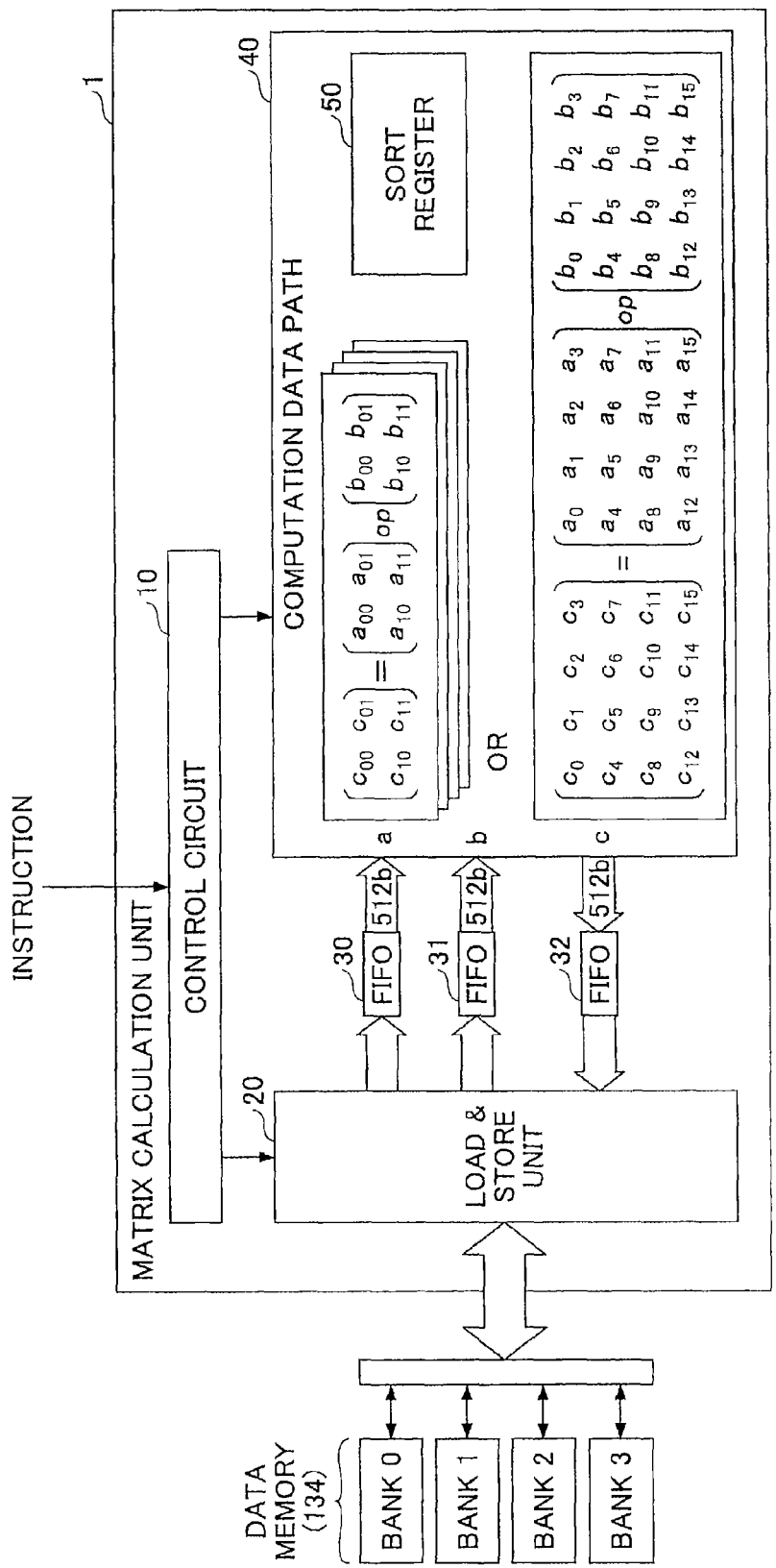
FIG. 4 is a diagram illustrating an example of hardware structure of the matrix calculation unit.

Next, a description will be given of the matrix calculation unit 1 that may be used in the mobile phone 1000 described above, for example. FIG. 4 is a diagram illustrating an example of hardware structure of the matrix calculation unit 1. For example, the matrix calculation unit 1 may include a control circuit 10, a load store unit 20, FIFOs (First-In-First-Outputs) 30, 31 and 32, and a computation data path 40 including a sort register 50.

The computation data path 40 may form an example of a matrix operation unit. In addition, the control circuit 10, the computation data path 40, and the sort register 50 may form an example of a converting unit. The sort register 50 and the FIFOs 30 and 31 may form an example of data storage part.

The control circuit 10 may control a group of AUs (Arithmetic Units) according to an instruction input from the CPU 135, for example. The instruction input to the control circuit 10 may include an operation type, a start address of a source (1), a start address of a source (2), a start address of a destination (or storage destination), and a number N of unit data of the operations, for example.

The load store unit 20 may exchange data between the data memory 134. In the following description, it is assumed for the sake of convenience that the data memory 134 in this embodiment includes 4 banks, and one line (that is, a data unit with which each of read and write may be performed at one time) of each bank has 512 bytes. In 1 cycle, the load store unit 20 may read or write 512-byte data with respect to each bank of the data memory 134. Hence, in 1 cycle, the load store unit 20 may read or write 2048 bytes of data, by reading or writing 512-byte data with respect to each of the 4 banks of the data memory 134. The FIFOs 30 and 31 may store the data read by the load store unit 20 from the data memory 134, and the FIFO 32 may store the data to be written by the load store unit 20 to the data memory 134.

Figure 5:
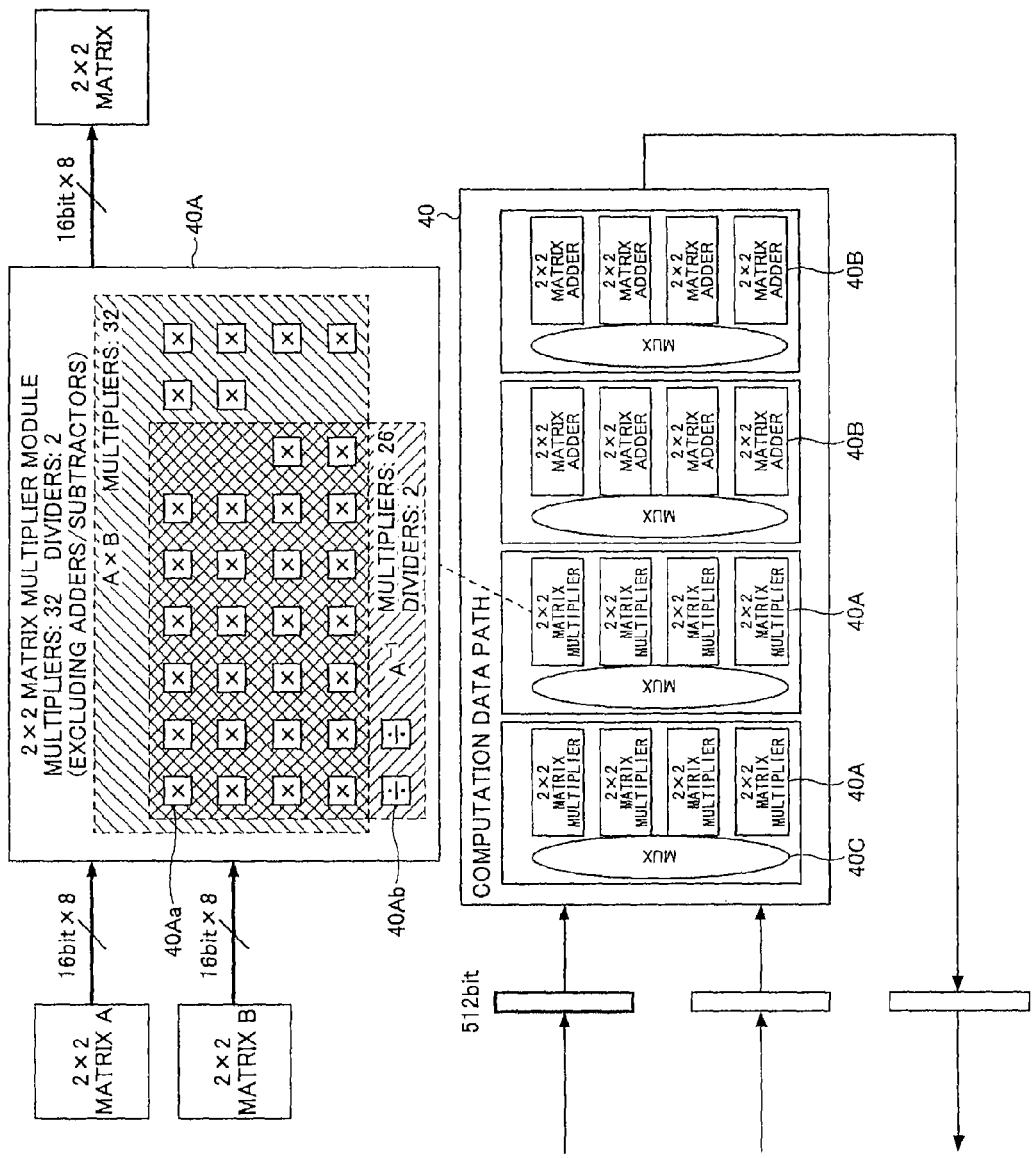
FIG. 5 is a diagram illustrating an example of hardware structure of a computation data path.

The computation data path 40 may perform a 2×2 matrix calculation or a 4×4 matrix calculation, for example. FIG. 5 is a diagram illustrating an example of hardware structure of the computation data path 40. For example, the computation data path 40 may include 8 2×2 matrix multiplier modules 40A, 8 2×2 matrix adder modules 40B, 2 multiplexers 40C provided with respect to 2 groups of 4 2×2 matrix multiplier modules 40A, respectively, and 2 multiplexers 40C provided with respect to 2 groups of 4 2×2 matrix adder modules 40B, respectively. The calculation data path 40 may switch connections among the modules, in order to perform a 4×4 matrix multiplication, 4 2×2 matrix multiplications in parallel (SIMD: Single Instruction Multiple Data), 4 2×2 inverse matrix operations in parallel (SIMD), and the like.

For example, the 2×2 matrix multiplier module 40A may include 32 multipliers 40Aa, 2 dividers 40Ab, and 24 adders (not illustrated). The 2×2 matrix multiplier module 40A may select its own function from a plurality of functions including the 2×2 matrix multiplication and the 2×2 inverse matrix operation. FIG. 5 illustrates a case in which the numerical value is a complex number having a 16-bit real part and a 16-bit imaginary part. However, the number of multipliers and the like may be reduced when only the real part is to be processed by the 2×2 matrix multiplier module 40A.

A description of the sort register 50 will be given later in the specification.

Figure 6:
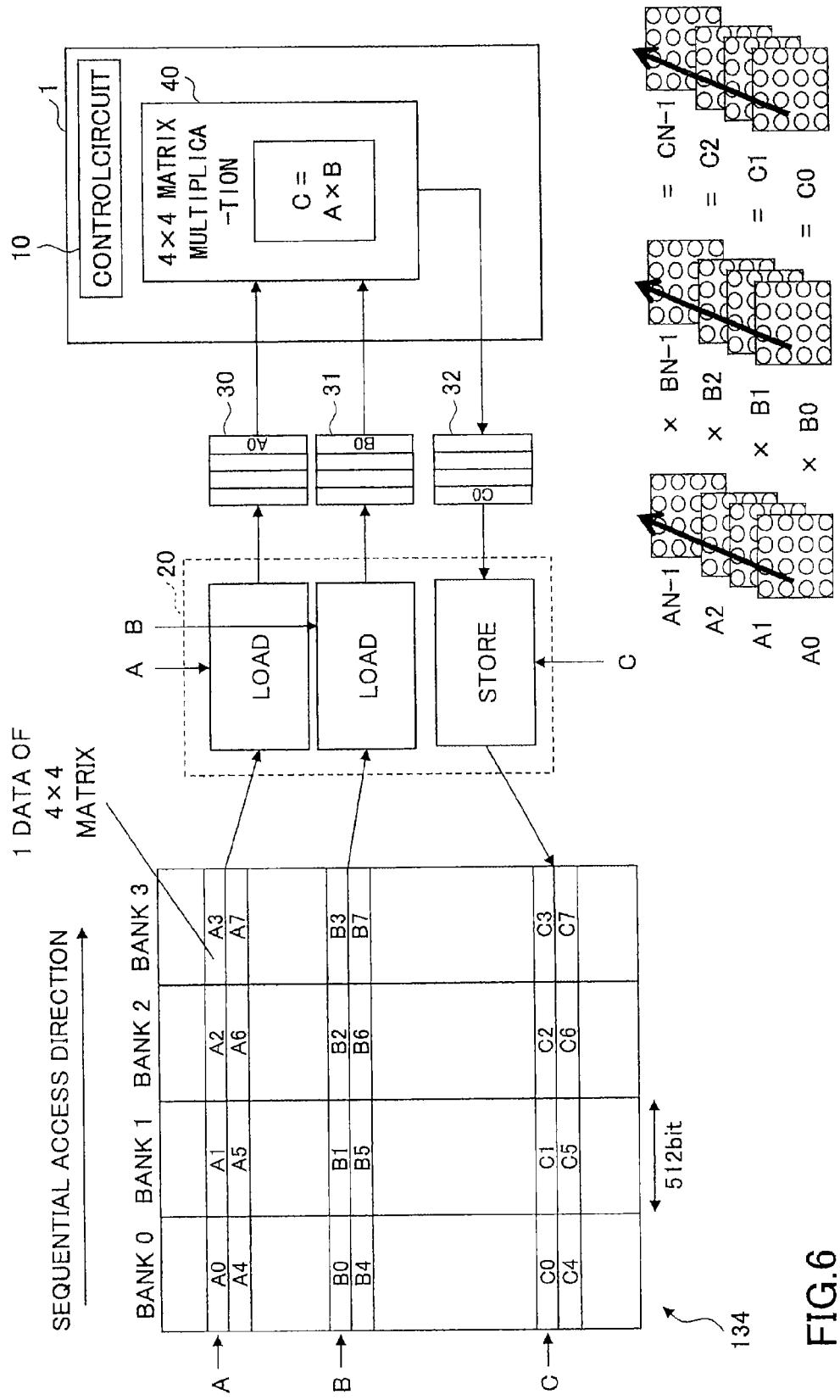
FIG. 6 is a diagram illustrating a state in which the matrix calculation unit in the first embodiment consecutively performs a 4×4 matrix multiplication N times by a stream process.

FIG. 6 is a diagram illustrating a state in which the matrix calculation unit 1 in the first embodiment consecutively performs the 4×4 matrix multiplication N times by the stream process. As illustrated in FIG. 6, the matrix calculation unit 1 first performs a matrix multiplication A0×B0 to store a multiplication result in C0, then performs a matrix multiplication A1×B1 to store a multiplication result in C1, and thereafter performs a matrix multiplication AN−1×BN−1 to store a multiplication result in CN−1. When the matrix calculation unit 1 receives, as the instruction, the operation type (in this example, the 4×4 matrix multiplication), a start address where A0 is stored, a start address where B0 is stored, a destination, and the number (N) of data, for example, the matrix calculation unit 1 may consecutively perform the matrix multiplication N times. The operation to consecutively process the plurality of data stored at consecutive addresses of the memory may be referred to as the "stream process".

The load store unit 20 performs an operation to read A0, then read A1, and then read A2, according to sequential access. Because reading of A0 and B0 from the same bank in the same cycle is not possible, the load store unit 20 may read B0 in the cycle next to the cycle in which A0 is read, so that the matrix operation A0×B0 may be performed at a time when A0 is stored in the FIFO 30 and B0 is stored in the FIFO 31. An access time as a whole may be reduced by storing sources in a plurality of banks and employing memory interleaving in which an access request to a next address (for example, A1) is issued during a delay time of the access to certain data (for example, A0).

Figure 7:
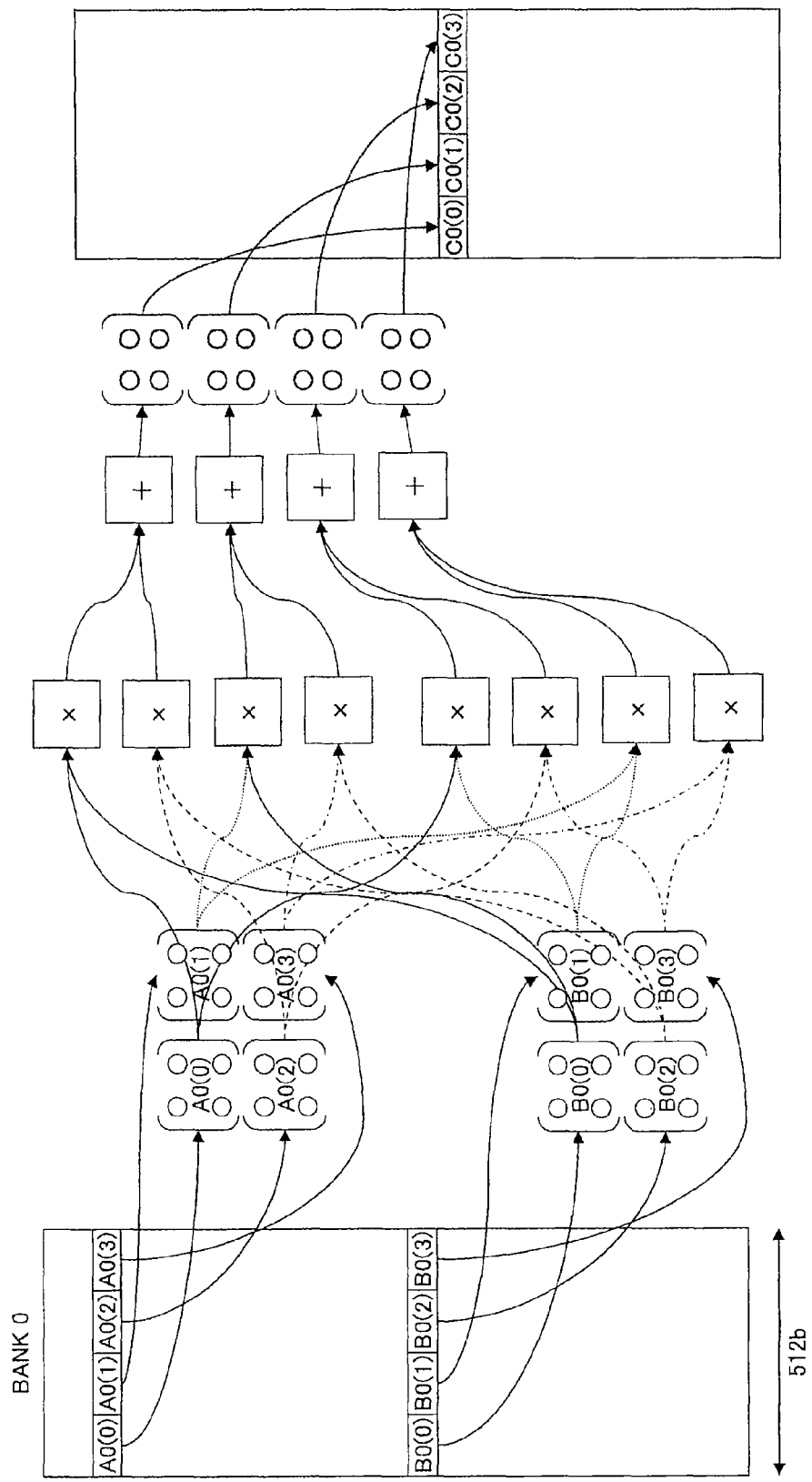
FIG. 7 is a diagram schematically illustrating a connection structure of the computation data path when performing an operation A0×B0=C0.

FIG. 7 is a diagram schematically illustrating a connection structure of the computation data path 40 when performing an operation A0×B0=C0. FIG. 7 illustrates A0 by decomposing A0 into 4 2×2 matrices A0(0), A0(1), A0(2), and A0(3). Similarly, FIG. 7 illustrates B0 by decomposing B0 into 4 2×2 matrices B0(0), B0(1), B0(2), and B0(3), and illustrates C0 by decomposing C0 into 4 2×2 matrices C0(0), C0(1), C0(2), and C0(2).

Figure 8:
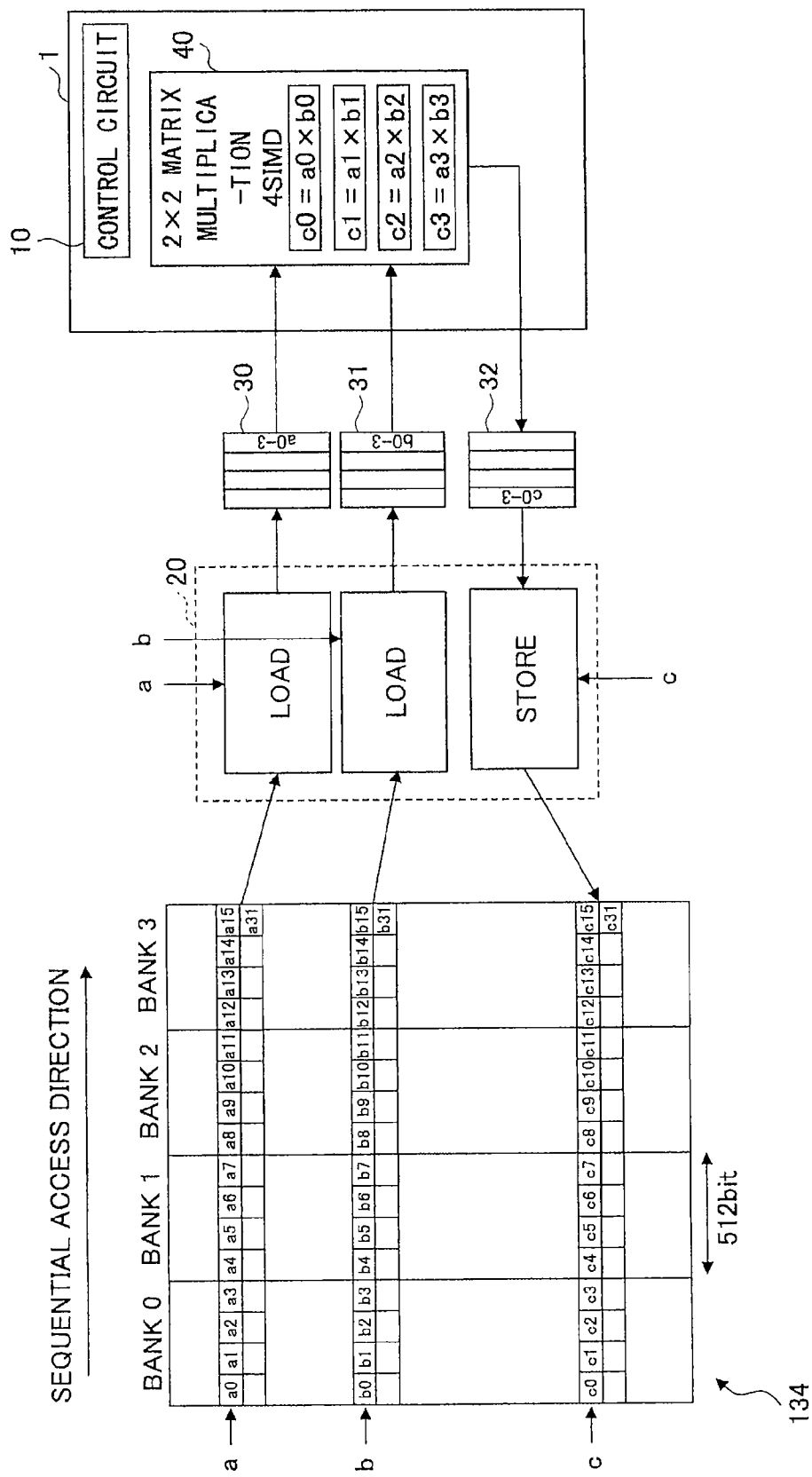
FIG. 8 is a diagram illustrating a state in which the matrix calculation unit in the first embodiment performs 2×2 matrix multiplications in parallel 4 times (4SIMD) by the stream process.

On the other hand, FIG. 8 is a diagram illustrating a state in which the matrix calculation unit in the first embodiment performs 2×2 matrix multiplications in parallel 4 times (4SIMD) by the stream process. As illustrated in FIG. 8, the matrix calculation unit 1 may perform, in parallel, a matrix multiplication a1×b1 to store a multiplication result in C0, a matrix multiplication a1×b1 to store a multiplication result in C1, a matrix multiplication a2×b2 to store a multiplication result in C2, and a matrix multiplication a3×b3 to store a multiplication result in C3. When the matrix calculation unit 1 receives, as the instruction, the operation type (in this example, the 2×2 matrix multiplication), a start address where A0 is stored, a start address where B0 is stored, destinations, and the number (N) of data, for example, the matrix calculation unit 1 may consecutively perform the parallel matrix multiplication N times. In this case, the matrix calculation unit 1 may regard A0 through A3 to a4N−4 through a4N−1, and b0 through b3 to b4N−4 through b4N−1 as the sources, respectively, and regard c0 through C3 to c4N−4 through c4N−1 as the destinations.

Figure 9:
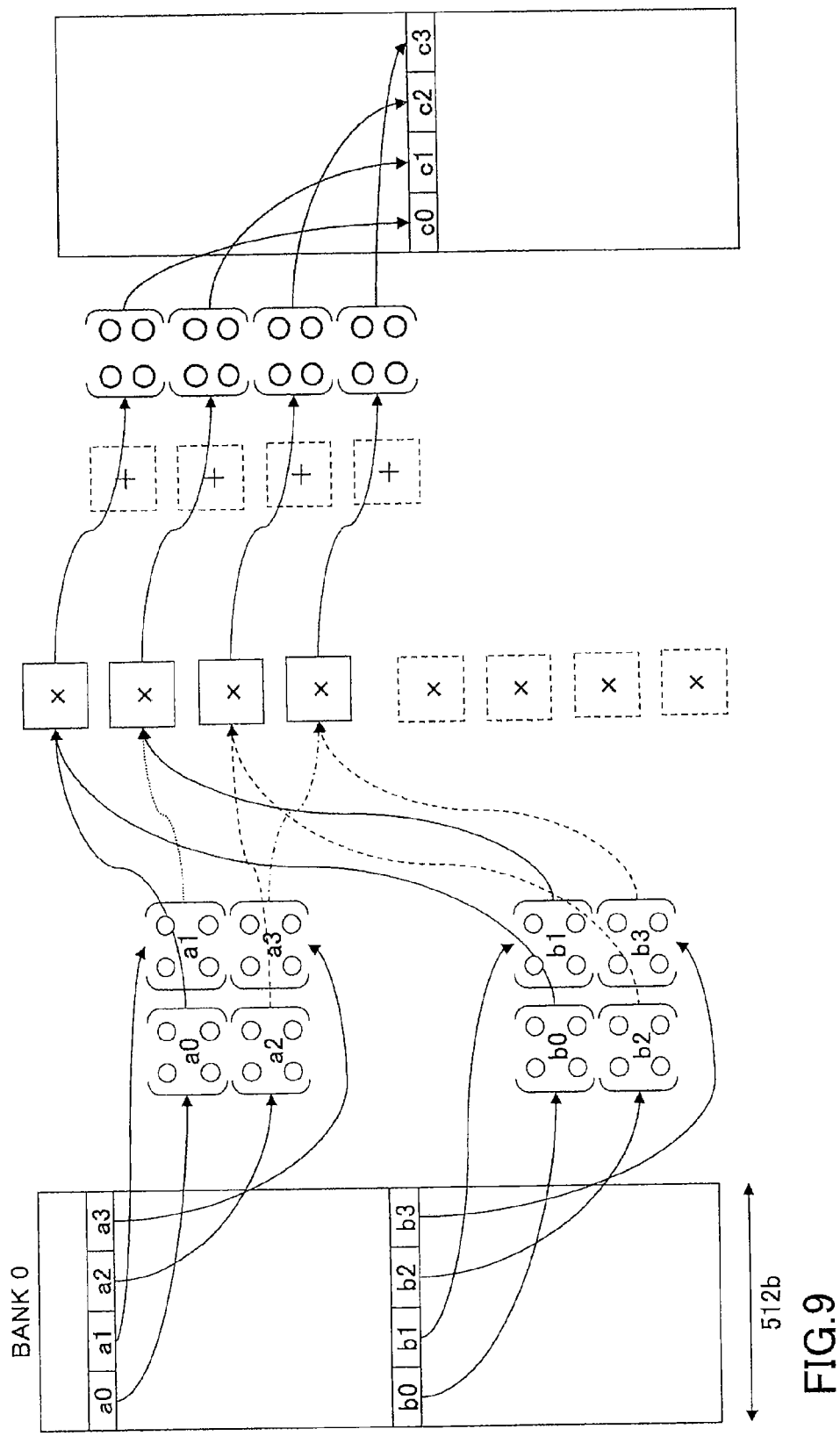
FIG. 9 is a diagram schematically illustrating the connection structure of the computation data path when performing operations a0×b0=c0, . . . , a3×b3=c3 in parallel.

FIG. 9 is a diagram schematically illustrating the connection structure of the computation data path 40 when performing operations a0×b0=c0, . . . , a3×b3=c3 in parallel. The 2×2 matrices such as a0, b0, and the like may be represented as data in which 4 matrix elements are arranged in a line in the data memory 134.

Figure 10:
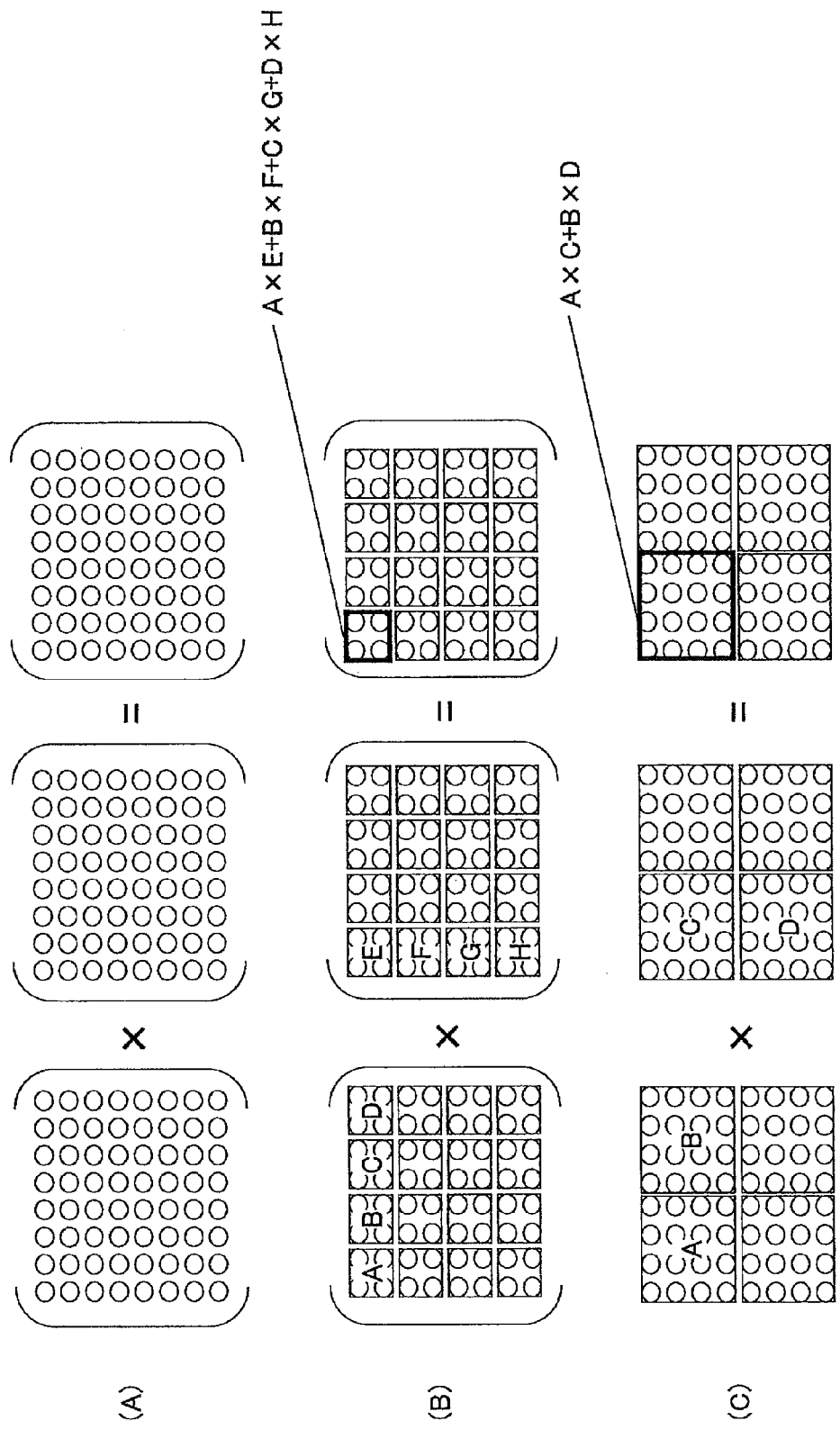
FIG. 10 is a diagram illustrating a state in which an 8×8 matrix multiplication is decomposed into 2×2 matrix multiplications or 4×4 matrix multiplications and processed.

Next, a description will be given of a size conversion in a general matrix operation. FIG. 10 is a diagram illustrating a state in which an 8×8 matrix multiplication is decomposed into 2×2 matrix multiplications or 4×4 matrix multiplications and processed. In FIG. 10, (A) illustrates a state in which the 8×8 matrix multiplication is performed as it is, and (B) illustrates a state in which the 8×8 matrix multiplication is decomposed into 2×2 matrices and processed. Each of the 2×2 matrices obtained by decomposing the operation result, the 8×8 matrix, of (B) in FIG. 10 into 16 2×2 matrices, may be the same as a result obtained by adding results of four 2×2 matrix multiplications. Similarly, in FIG. 10, (C) illustrates a state in which the 8×8 matrix multiplication is decomposed into 4×4 matrices and processed. Each of the 4×4 matrices obtained by decomposing the operation result, the 8×8 matrix, of (C) in FIG. 10 into 4 4×4 matrices, may be the same as a result obtained by adding results of two 4×4 matrix multiplications.

Case in which Sources of 2×2 Matrix Operations Performed in Parallel Exist on Same Line In a case in which the sources of the operations performed in parallel are stored on the same line in the data memory 134 as illustrated in FIG. 8, the data a0 through a3 and b0 through b3 stored for the 2×2 matrix operation, for example, may be regarded as a 4×4 matrix in order to perform the 4×4 matrix operation. However, the control circuit 10 in this case may require a data interpretation to be performed.

FIG. 11 is a diagram illustrating a general rule to interpret the 4×4 matrix from data stored in a memory. When the 4×4 matrix is interpreted according to this rule, however, data (1) through (4) that originally are elements of the 2×2 matrix do not form the 2×2 matrix within the 4×4 matrix, and a large amount of process may be required in order to regard the data stored for the 2×2 matrix operation as the 4×4 matrix in order to perform the 4×4 matrix operation.

On the other hand, FIG. 12 is a diagram illustrating a rule employed by the control circuit 10 in the first embodiment to interpret the 4×4 matrix from the data stored in the data memory 134. As illustrated in FIG. 12, according to this rule, the matrix elements forming the 4×4 matrix have a data arrangement maintaining the format of the 2×2 matrix. As a result, the matrix calculation unit 1 in this embodiment may regard the data stored for the 2×2 matrix operation as the 4×4 matrix, and easily perform the 4×4 matrix operation. In addition, the matrix calculation unit 1 in this embodiment may regard the data stored for the 4×4 matrix operation as the 2×2 matrix, and easily perform the 2×2 matrix operation.

Case In which Sources of 2×2 Matrix Operations Performed in Parallel do not Exist on Same Line On the other hand, in a case in which the sources of the operations performed in parallel are not stored on the same line in the data memory 134, it may be difficult to regard the data stored for the 2×2 matrix operation as the 4×4 matrix and to perform the 4×4 matrix operation. For this reason, the matrix calculation unit 1 in this embodiment may include a function to mutually convert between the data array suited for the 2×2 matrix operation and the data array suited for the 4×4 matrix operation. A convert instruction that instructs the conversion of the data array may be sent from the CPU 135 to the control circuit 10.

FIG. 13 is a diagram illustrating a data array in which sources of 2×2 matrices to be calculated in parallel are not stored on the same line in the data memory 134. With respect to the data array illustrated in FIG. 13, the matrix calculation unit 1 in this embodiment may perform, in parallel, processes to perform operations on the source (1) and the source (2) and storing an operation result to the destination. For example, the matrix calculation unit 1 may perform, in parallel, operations to store a result of c0×e0 to i0, store a result of b0×f0 to j0, store a result of a0×g0 to k0, and store a result of d0×h0 to i0.

In a case in which the 2×2 matrices are combined into a 4×4 matrix and the 4×4 matrix operation is performed, with respect to the data array illustrated in FIG. 13, it may be required to perform a process to store c0, b0, a0 and d0 forming the sources (a) into A0, and to store e0, f0, g0 and h0 forming the sources (2) into B0. On the other hand, in a case in which the 4×4 matrix is decomposed into 2×2 matrices and the 2×2 matrix operations are performed, with respect to the data array illustrated in FIG. 13, it may be required to perform a process to decompose A0 into c0, b0, a0 and d0 and store them in different lines, and to decompose B0 into e0, f0, g0 and h0 and store them in different lines.

Figure 14:
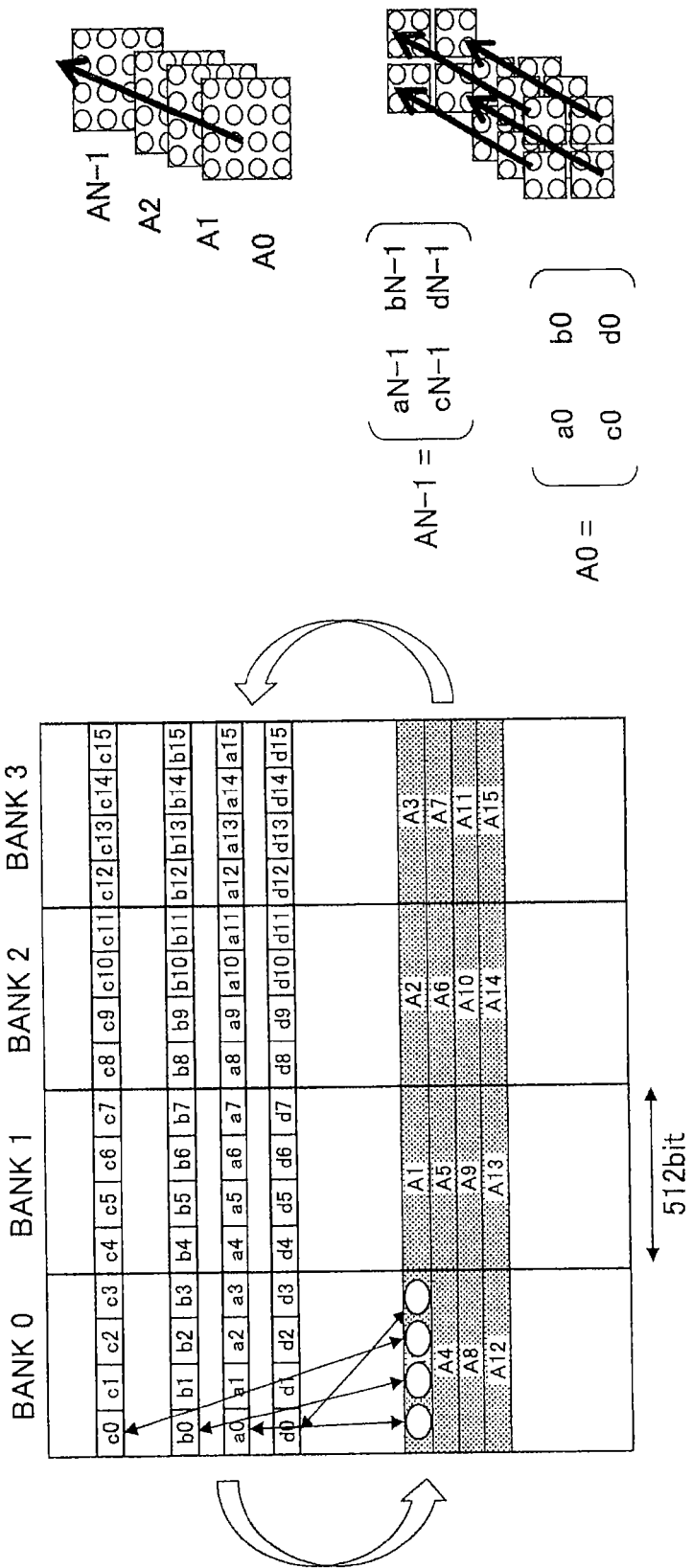
FIG. 14 is a diagram schematically illustrating a conversion process performed by the matrix calculation unit.

FIG. 14 is a diagram schematically illustrating a conversion process performed by the matrix calculation unit 1. FIG. 14 illustrates the data by focusing only on the sources (1).

Conversion of Data Array

Next, a description will be given of the conversion process performed by the matrix calculation unit 1 in this embodiment.

Figure 15:
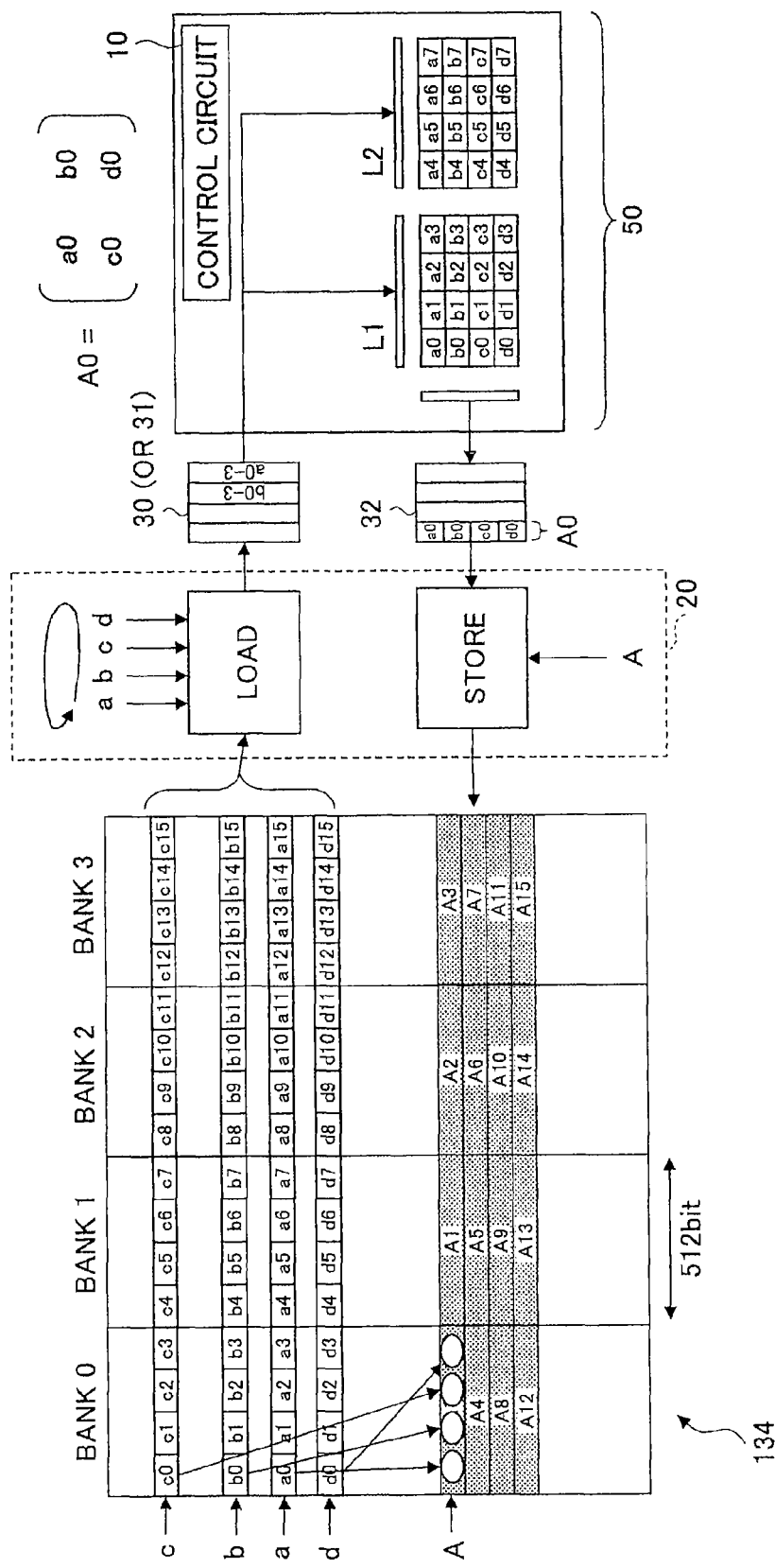
FIG. 15 is a diagram for explaining a process of converting a data array for 2×2 matrix operation into a data array for 4×4 matrix operation.

First, a description will be given of a process to convert the data array for 2×2 matrix operation into the data array for 4×4 matrix operation. FIG. 15 is a diagram for explaining the process of converting the data array for the 2×2 matrix operation into the data array for 4×4 matrix operation.

When the control circuit 10 receives a data array convert instruction from the CPU 135, the control circuit 10 controls the load and store unit 20 to read the data from the data memory 134, in the order of a0 through a3, b0 through b3, c0 through c3, d0 through d3, a4 through a7, . . . , for example, and to store the read data into the FIFO 30 (or 31). In addition, the control circuit 10 performs a process to store, in a row direction, the data stored in the FIFO 30 into the sort register 50 having a layer L1 and a layer L2, and to read, in a column direction, the data stored in the sort register 50 and write the read data into the FIFO 32. As a result, the data read from the FIFO 32 and written into the data memory 134 become a0, b0, c0 and d0, for example, having the format suited for the 4×4 matrix operation. In this case, as illustrated in FIG. 15, data sequences a0 through aN−1, b0 through bN−1 and the like may be arranged in an order other than the order of the array in the 4×4 matrix.

Figure 16:
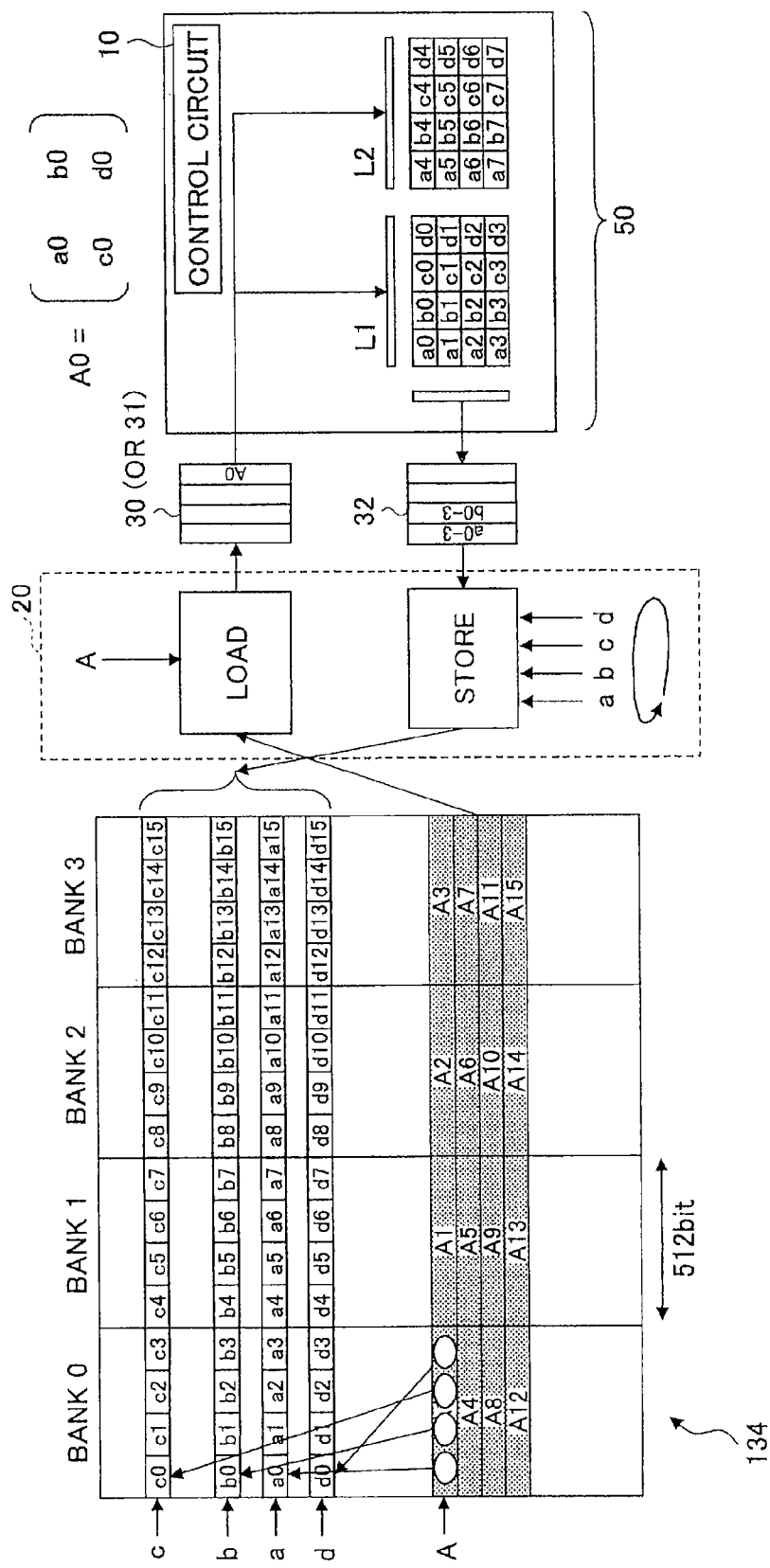
FIG. 16 is a diagram for explaining a process of converting a data array for 4×4 matrix operation into a data array for 2×2 matrix operation.

Unlike FIG. 15, FIG. 16 is a diagram for explaining a process of converting a data array for 4×4 matrix operation into a data array for 2×2 matrix operation. When the control circuit 10 receives a data array convert instruction from the CPU 135, the control circuit 10 controls the load store unit 20 to read A0, for example, from the data memory 134, and to store the read data A0 into the FIFO 30 (or 31). In addition, the control circuit 10 performs a process to store, in the column direction, the data stored in the FIFO 30 into the sort register 50, and to read, in the row direction, the data stored in the sort register 50 and write the read data into the FIFO 32. As a result, the data read from the FIFO 32 and written into the data memory 134 become a0 through a3, b0 through b3, c0 through c3 and d0 through d3, for example, having the format suited for the 2×2 matrix operation.

Figure 17:
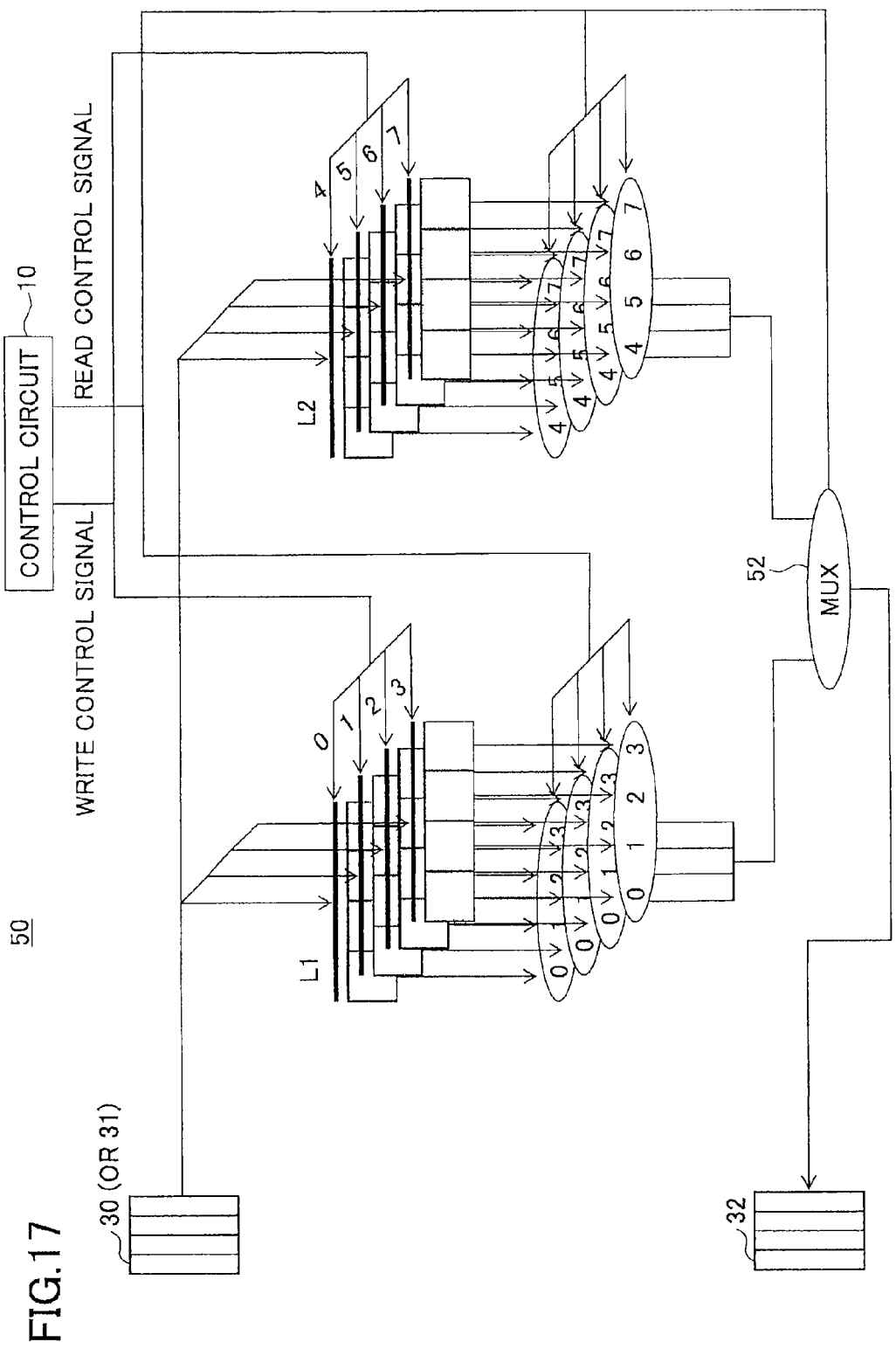
FIG. 17 is a diagram schematically illustrating a structure and functions of a sort register.
Figure 18:
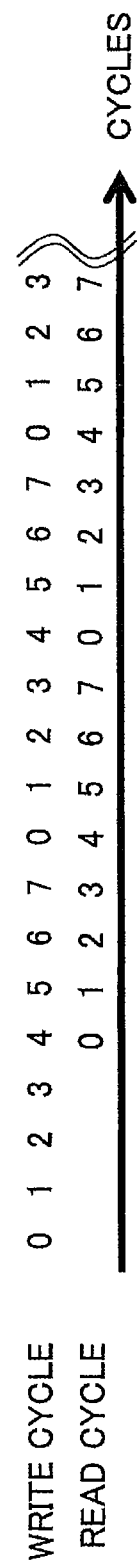
FIG. 18 is a diagram illustrating a state in which a write cycle and a read cycle are offset and controlled.

FIG. 17 is a diagram schematically illustrating a structure and functions of the sort register 50. The sort register 50 may include the layer L1 and the layer L2. In FIG. 17, the numerals represent processing orders of the write cycle and the read cycle. The write cycle and the read cycle may be controlled to have phases mutually offset by 4 cycles, for example. FIG. 18 is a diagram illustrating a state in which the write cycle and the read cycle are offset and controlled.

For example, a0 through a3 are written to a first line of the layer L1 in a write cycle 0, b0 through b3 are written to a second line of the layer L1 in a write cycle 1, c0 through c3 are written to a third line of the layer L1 in a write cycle 2, and d0 through d3 are written to a fourth line of the layer L1 in a write cycle 3. Next, a4 through a7 are written to a first line of the layer L2 in a write cycle 4, b4 through b7 are written to a second line of the layer L2 in a write cycle 5, c4 through c7 are written to a third line of the layer L2 in a write cycle 6, and d4 through d7 are written to a fourth line of the layer L2 in a write cycle 7. A write control signal to control the write in the above write cycles may be output from the control circuit 10.

On the other hand, a first (or start) data of each line of the layer L1 is read in a read cycle 0, a second data of each line of the layer L1 is read in a read cycle 1, a third data of each line of the layer L1 is read in a read cycle 2, and fourth data of each line of the layer L1 is read in a read cycle 3. Next, a first (or start) data of each line of the layer L2 is read in a read cycle 4, a second data of each line of the layer L2 is read in a read cycle 5, a third data of each line of the layer L2 is read in a read cycle 6, and fourth data of each line of the layer L2 is read in a read cycle 7. A multiplexer (MUX) 52 may be connected to the sort register 50, and the data read from either one of the layers L1 and L2 of the sort register 50 may be stored in the FIFO 32 via the multiplexer 52. A read control signal to control the read in the above read cycles may be output from the control circuit 10.

In the write cycles 0 through 3, the read is made from a bank 0, for example, and in the write cycles 4 through 7, the read is made from a bank 1, for example. Similarly, in the read cycles 0 through 3, the write is made to the bank 0, for example, and in the read cycles 4 through 7, the write is made to the bank 1, for example. The matrix calculation unit 1 in this embodiment may mutually offset the write cycles and the read cycles, in order to simultaneously perform the read and the write with respect to the data memory 134 and enable the conversion process to be performed quickly. In a case in which a contention of the read target bank and the write target bank occurs even through the write and read cycles are controlled in the manner described above, the write to the data memory 134 may be given priority over the read from the data memory 134, for example.

Figure 19:
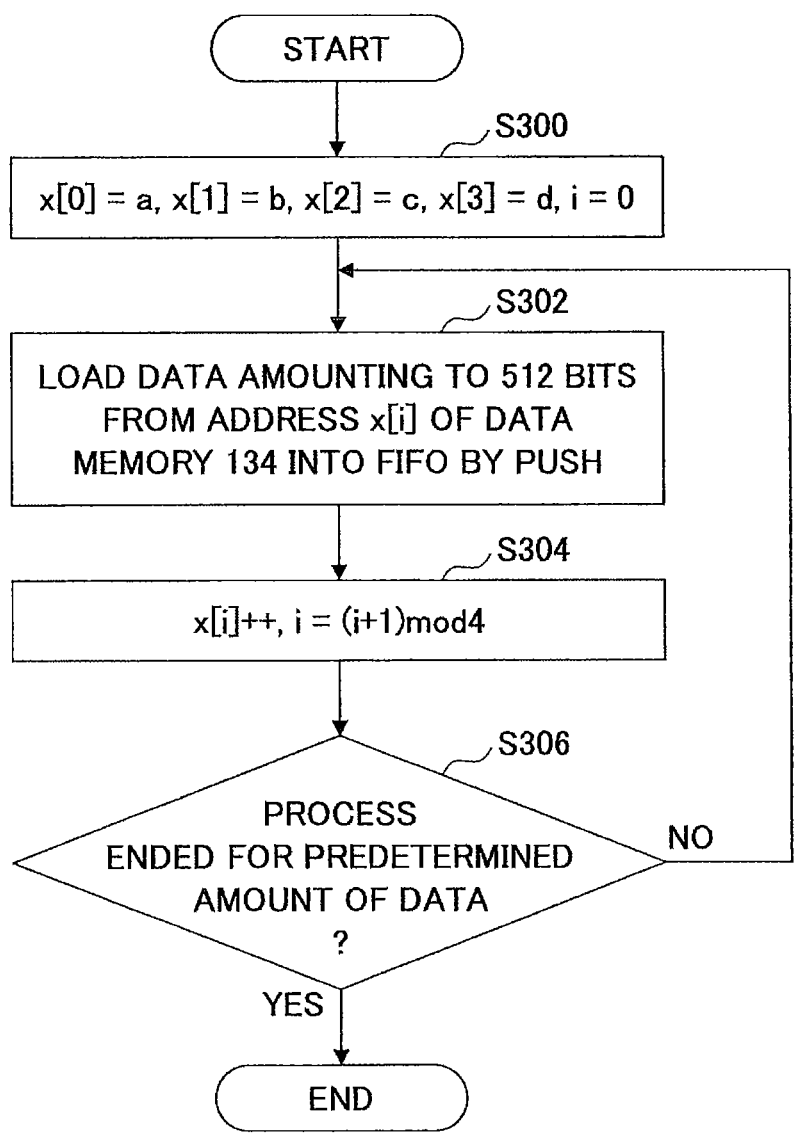
FIG. 19 is a flow chart illustrating an example of a process executed by the control circuit when the conversion process is performed to convert the 2×2 matrix into the 4×4 matrix.

FIG. 19 is a flow chart illustrating an example of a process executed by the control circuit 10 when the conversion process is performed to convert the 2×2 matrix into the 4×4 matrix.

First, the control circuit 10 defines x[0]=a, x[1]=b, x[2]=c, and x[3]=d, and sets an initial value of a variable i to 0 (step S300).

Next, the control circuit 10 loads data amounting to 512 bits from an address x[i] of the data memory 134, and stores the loaded data into the FIFO 30 by a push operation (step S302).

Next, the control circuit 10 increments x[i] by 1 bank (for example, increments a0 to a4, increments b0 to b4, etc.) and updates the variable according to the following formula (1) (step S304).

$$i=(i+1) \bmod 4 \tag{1}$$

Next, the control circuit 10 judges whether the process ended for a predetermined amount (or predetermined number) of data (step S306). The process ends when the predetermined amount of data is processed and the judgement result in step S306 is YES. On the other hand, when the predetermined amount of data is not yet processed and the judgement result in step S306 is NO, the process returns to step S302.

Example Of Calculation Process Suited for Conversion

Figure 20:
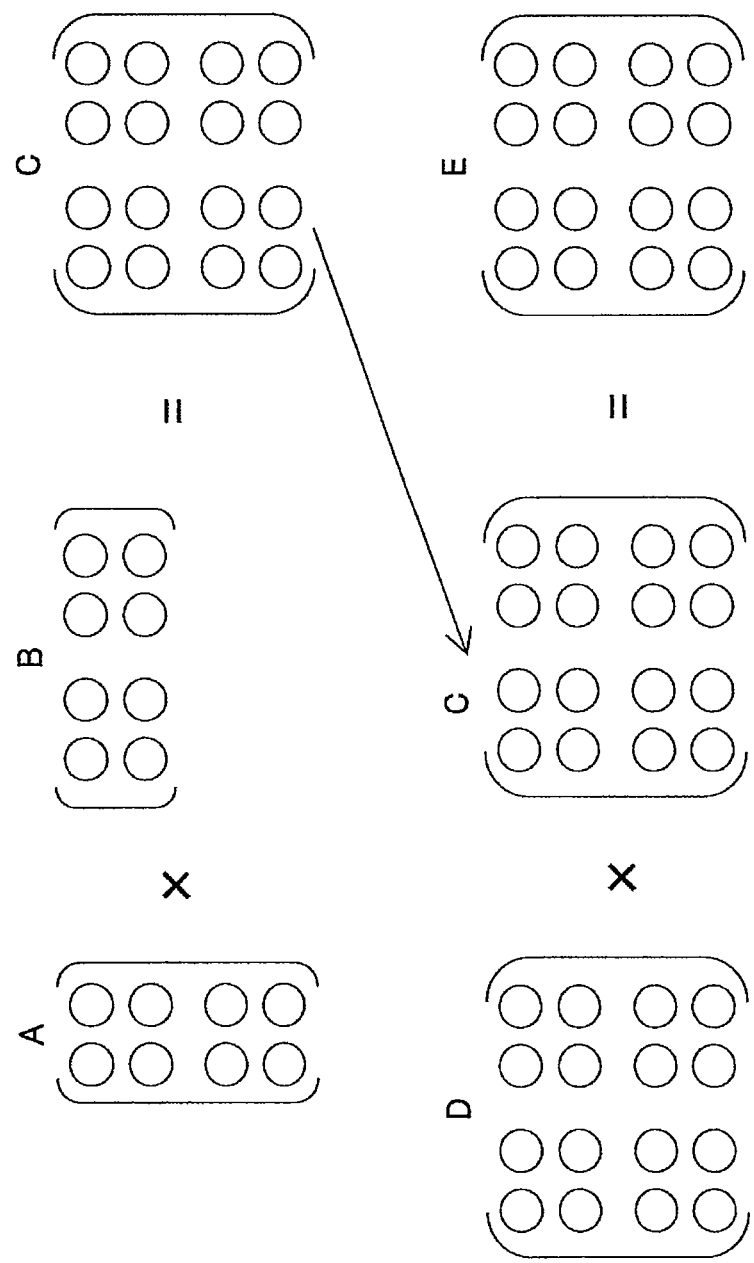
FIG. 20 is a diagram illustrating an operation to obtain a 4×4 matrix E by multiplying a result of a multiplication of a 4×2 matrix A and a 2×4 matrix B to a 4×4 matrix D.

A description will be given of an example of the calculation process that is suited for a case in which the data array is converted between the 2×2 matrix and the 4×4 matrix. FIG. 20 is a diagram illustrating an operation to obtain a 4×4 matrix E by multiplying a result of a multiplication of a 4×2 matrix A and a 2×4 matrix B to a 4×4 matrix D.

Figure 21:
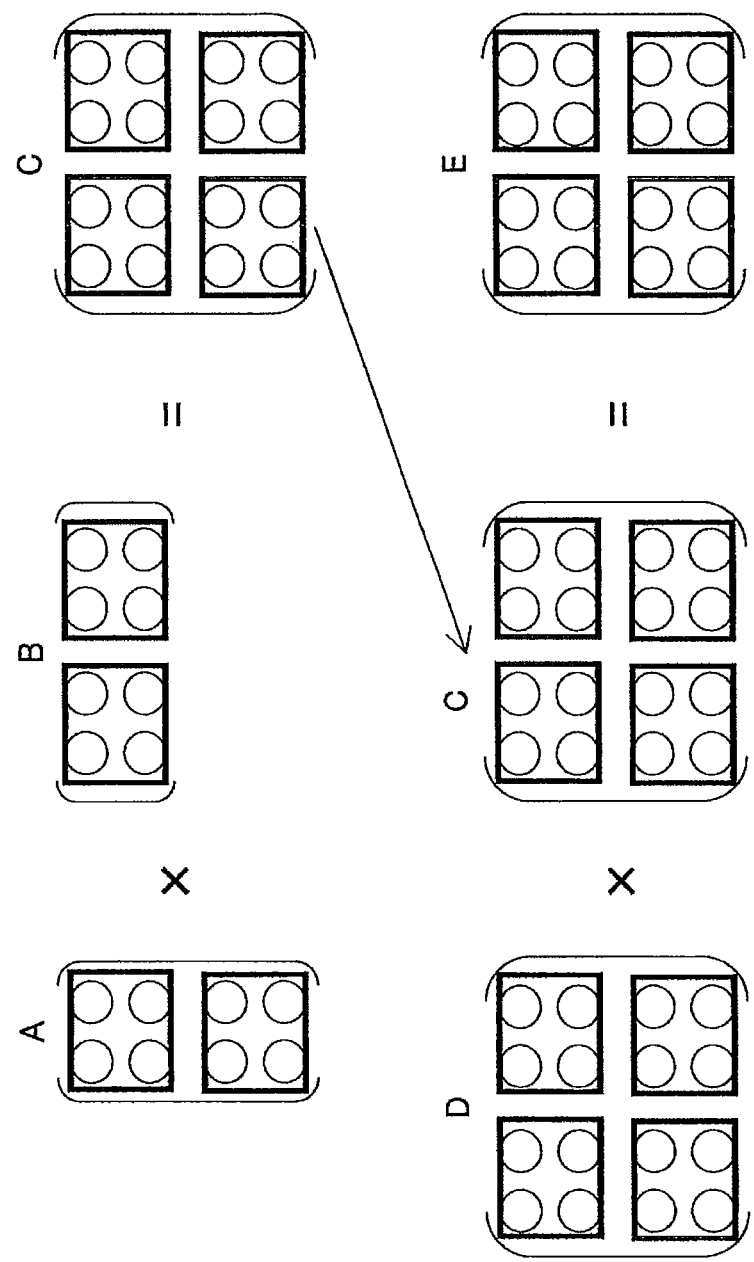
FIG. 21 is a diagram illustrating a state in which all of the calculation process is performed using 2×2 matrices.

In the case of a matrix computing unit not having a function to convert the data array, unlike the matrix computing unit 1 in this embodiment, all of the calculation process needs to be performed using the 2×2 matrices, as illustrated in FIG. 21. FIG. 21 is a diagram illustrating a state in which all of the calculation process is performed using the 2×2 matrices.

Figure 22:
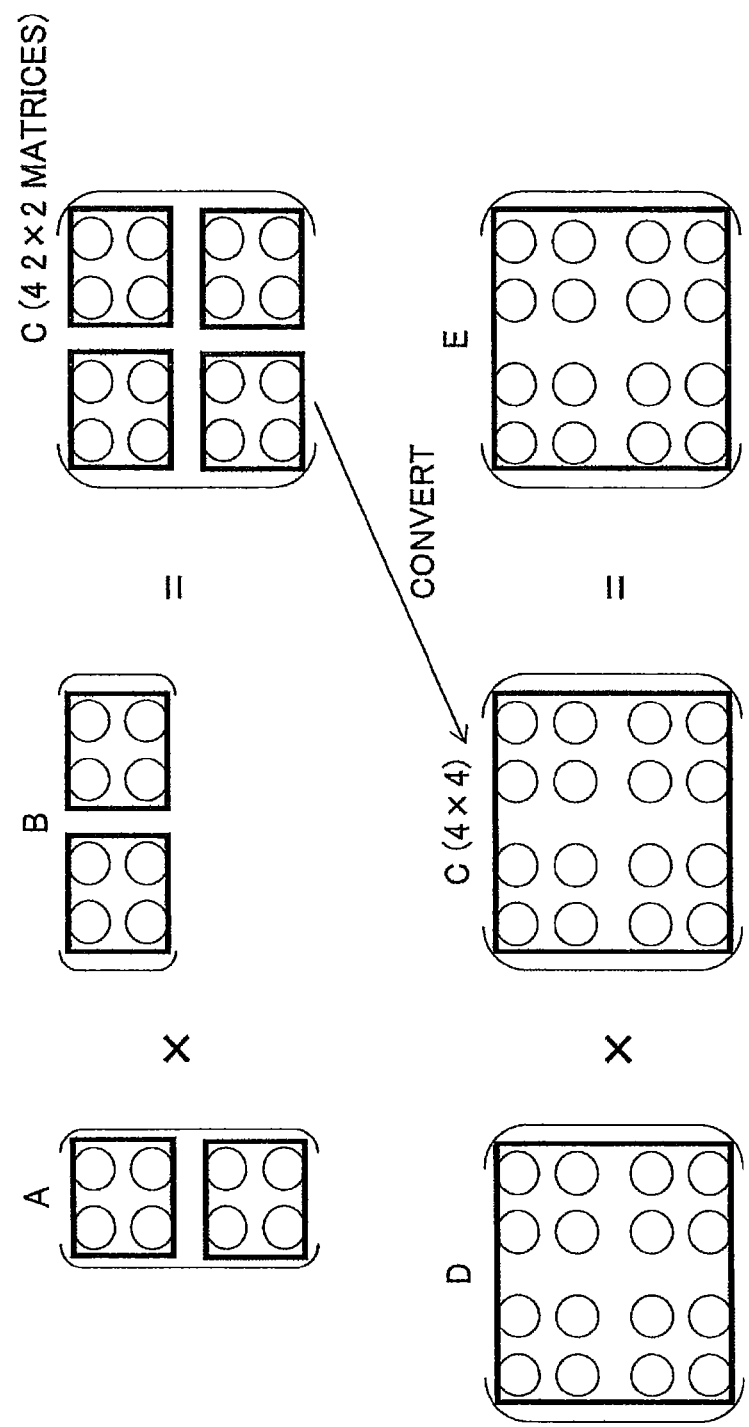
FIG. 22 is a diagram illustrating a process of the matrix calculation unit in the first embodiment.

On the other hand, in the case of the matrix calculation unit 1 in this embodiment, A×B may be calculated using the 2×2 matrices, and the data array of the calculation result of the 2×2 matrix operation may then be converted into the format suited for the 4×4 matrix operation. Hence, the matrix operation C×D may be performed using the 4×4 matrix. FIG. 22 is a diagram illustrating the process of the matrix calculation unit 1 in the first embodiment.

In addition, a situation may require an inverse matrix of the 4×4 matrix to be obtained during the 4×4 matrix operation. However, depending on the size and/or performance of the matrix computing unit, the inverse matrix operation may be possible only for the 2×2 matrix. Hence, in the case of the matrix computing unit not having the function to convert the data array, unlike the matrix computing unit 1 in this embodiment, all of the calculation process needs to be performed from the start using the 2×2 matrices.

Figure 23:
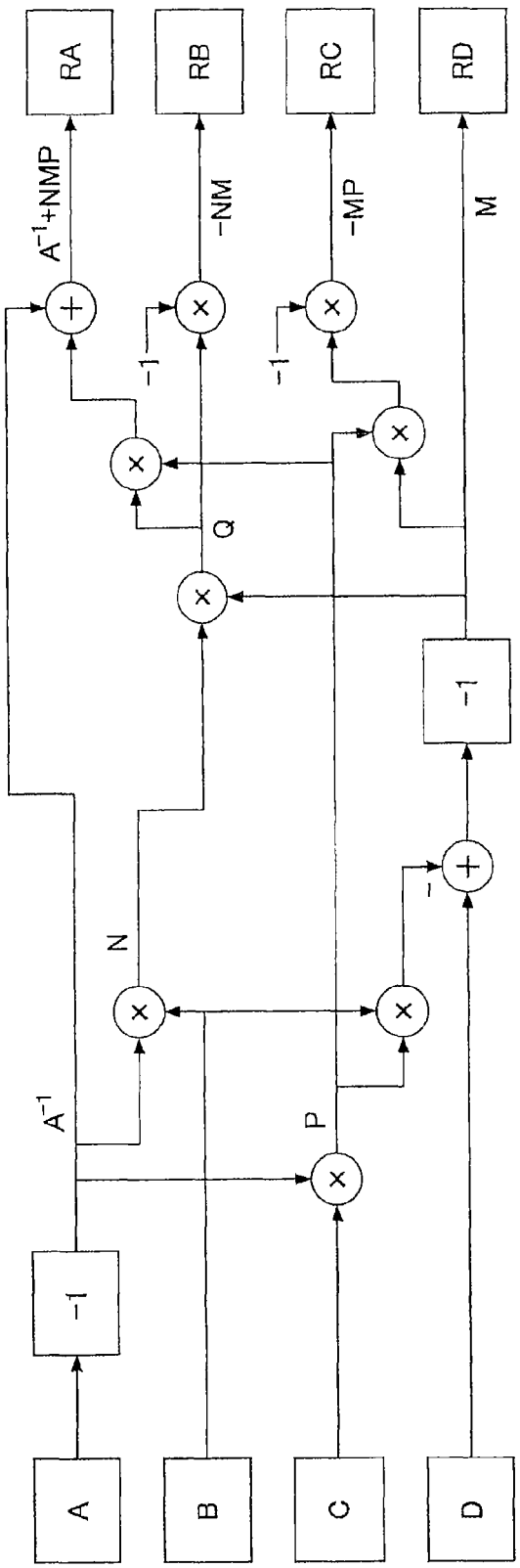
FIG. 23 is a block diagram illustrating a process of deriving 2×2 components RA, RB, RC, and RD of an inverse matrix $X^{-1}$ of X from 2×2 matrices A, B, C, and D.

On the other hand, the matrix calculation unit 1 in this embodiment may decompose the 4×4 matrix X into 2×2 matrices A, B, C and D, for example, and obtain 2×2 components RA, RB, RC and RD of an inverse matrix $X^{-1}$ of the 4×4 matrix X using these 2×2 matrices A, B, C and D. In addition, the matrix calculation unit 1 may utilize the conversion function to combine the 2×2 components RA, RB, RC and RD to convert the 2×2 matrices into the 4×4 matrix, in order to obtain the inverse matrix $X^{-1}$ of the 4×4 matrix X. The following formula (2) may be used to derive the 2×2 components RA, RB, RC and RD of the inverse matrix $X^{-1}$ of the 4×4 matrix X, from the 2×2 matrices A, B, C and D. In addition, FIG. 23 is a block diagram illustrating the process of deriving 2×2 components RA, RB, RC, and RD of the inverse matrix $X^{-1}$ of the 4×4 matrix X from the 2×2 matrices A, B, C, and D.

$$\begin{pmatrix} A & B \\ C & D \end{pmatrix}^{-1} = \begin{pmatrix} A^{-1} + A^{-1}B(D-CA^{-1}B)^{-1}CA^{-1} & -A^{-1}B(D-CA^{-1}B)^{-1} \\ -(D-CA^{-1}B)^{-1}CA^{-1} & (D-CA^{-1}B)^{-1} \end{pmatrix}$$

$$= \begin{pmatrix} A^{-1} + A^{-1}BMCA^{-1} & -A^{-1}BM \\ -MCA^{-1} & M \end{pmatrix}$$

$$= \begin{pmatrix} A^{-1} + NMCA^{-1} & -NM \\ -MCA^{-1} & M \end{pmatrix}$$

$$= \begin{pmatrix} A^{-1} + QP & -Q \\ -MP & M \end{pmatrix}$$

$$= \begin{pmatrix} RA & RB \\ RC & RD \end{pmatrix}$$

$$P = CA^{-1}, N = A^{-1}B, M = (D-CA^{-1}B)^{-1}, Q = NM$$

According to the example of the structure illustrated in FIG. 5, the matrix calculation unit 1 in this embodiment may perform the 4×4 matrix operation in 1 cycle. However, when the 4×4 matrix calculation is to be realized by 2×2 matrix operations, a time on the order of approximately 3 cycles may be required, for example. Hence, the matrix calculation unit 1 in this embodiment may have the function to mutually convert between the data array suited for the 2×2 matrix operation and the data array suited for the 4×4 matrix operation. As a result, the matrix calculation unit 1 in this embodiment may perform a flexible process by using the 4×4 matrix operation for the process as much as possible, and by using the 2×2 matrix operations only for the process requiring the 2×2 matrix operations. Consequently, the matrix calculation unit 1 in this embodiment may efficiently perform the matrix operation.

Conclusion

As described above, the matrix calculation unit 1 in this embodiment may have the function to mutually convert between the data array suited for the 2×2 matrix operation and the data array suited for the 4×4 matrix operation, and thus, the matrix operation may be performed efficiently.

Second Embodiment

Next, a description will be given of a matrix calculation unit 2 in a second embodiment of the present invention, by referring to FIGS. 24 and 25. The matrix calculation unit 2 in this embodiment may mutually convert between the data array suited for the 2×2 matrix operation and the data array suited for the 4×4 matrix operation, using a structure different from that of the first embodiment. Accordingly, a description will be given of parts of this embodiment that are different from the first embodiment.

Figure 24:
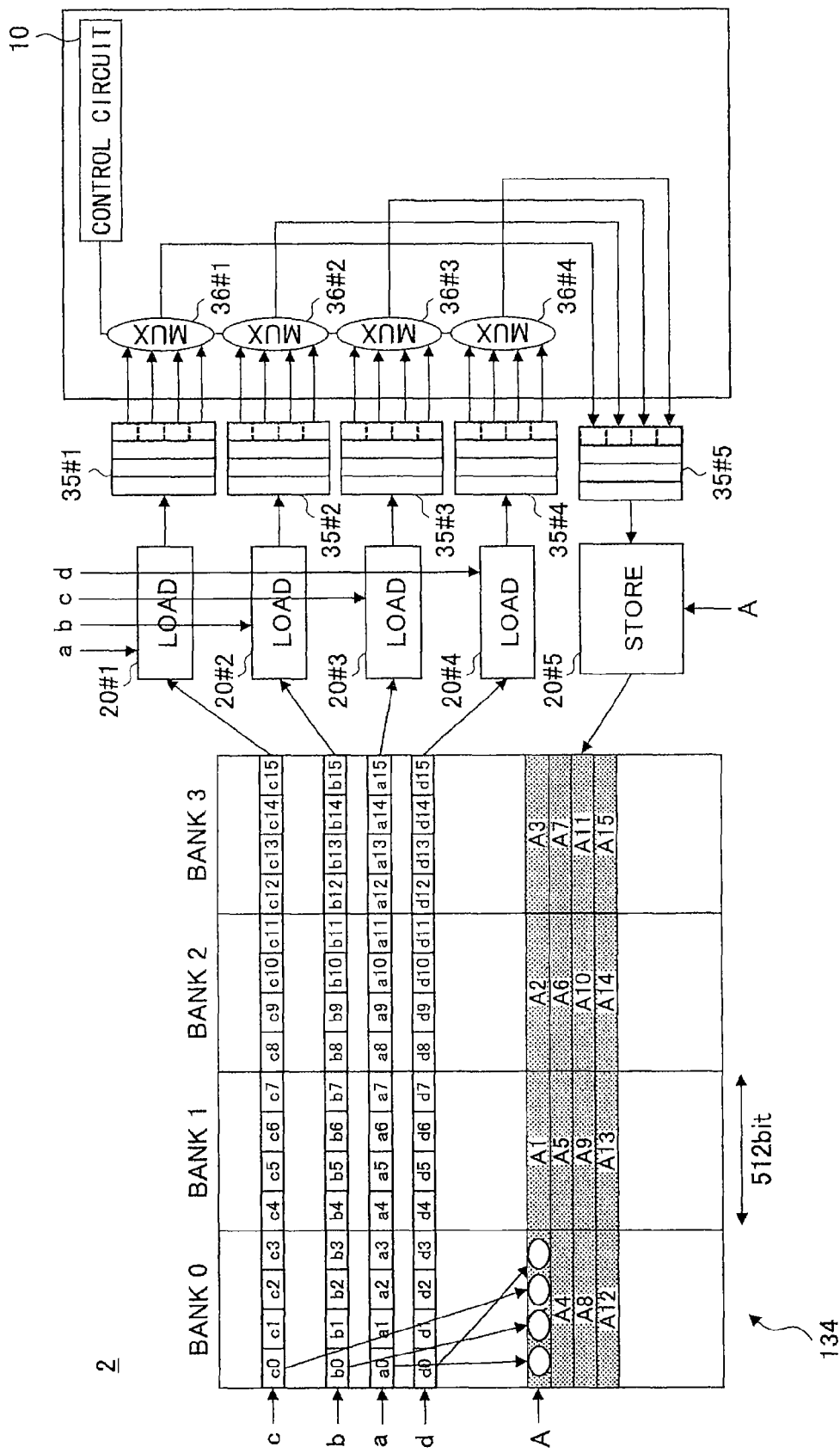
FIG. 24 is a diagram for illustrating a process of converting a data array for 2×2 matrix calculation into a data array for 4×4 matrix calculation by the matrix calculation unit in a second embodiment.

FIG. 24 is a diagram for illustrating a process of converting a data array for 2×2 matrix calculation into a data array for 4×4 matrix calculation by the matrix calculation unit 2 in the second embodiment. The matrix calculation unit 2 in this embodiment may include a load store unit 20 for each data stream (or for each source, or for each destination). In the example illustrated in FIG. 24, load and store units 20#1, 20#2, 20#3, 20#4, and 20#5 are provided with respect to 5 data streams, respectively. The load store units 20#1, 20#2, 20#3, 20#4, and 20#5 in this embodiment may be connected to, or include, FIFOs 35#1, 35#2, 35#3, 35#4, and 35#5, respectively. The FIFOs 35#1, 35#2, 35#3, and 35#4 may be connected to multiplexers 36#1, 36#2, 36#3, and 36#4, respectively. The multiplexers 36#1, 36#2, 36#3, and 36#4 may be synchronized and successively read the data from the FIFOs 35#1, 35#2, 35#3, and 35#4 starting from the first data stored in each line, and write the read data into the FIFO 35#5. The FIFOs 35#1, 35#2, 35#3, and 35#4 are popped when one data is read. Hence, the data array for the 2×2 matrix operation may be converted into the data array for the 4×4 matrix operation.

The load and store units 20#1, 20#2, 20#3, 20#4 may form an example of a plurality of data input and output parts, and the multiplexers 36#1, 36#2, 36#3, and 36#4 may form an example of a plurality of data extracting parts. In addition, the FIFO 35#5 may form an example of a data storage part.

Figure 25:
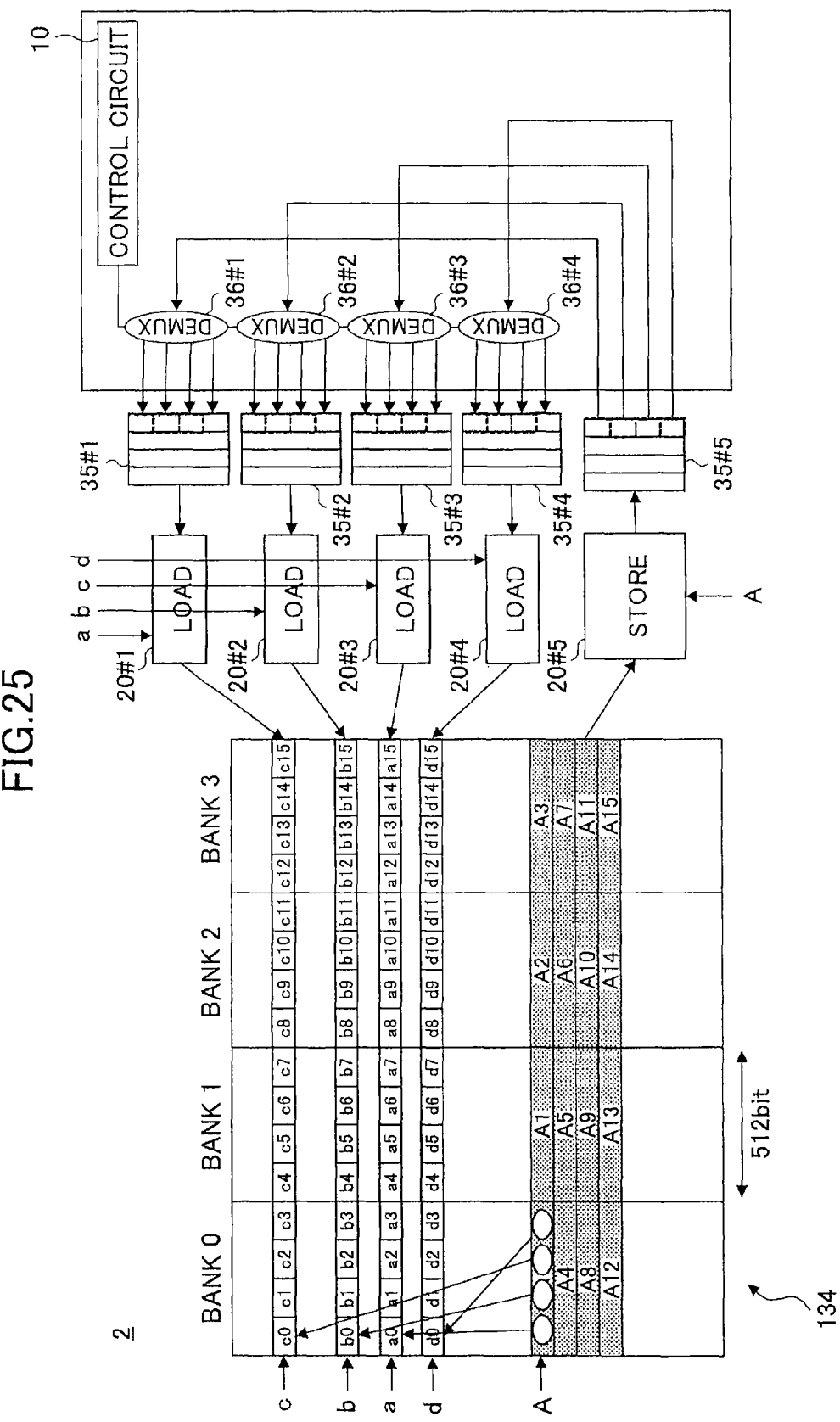
FIG. 25 is a diagram for illustrating a process of converting a data array for 4×4 matrix calculation into a data array for 2×2 matrix calculation by the matrix calculation unit in the second embodiment.

FIG. 25 is a diagram for illustrating a process of converting a data array for 4×4 matrix calculation into a data array for 2×2 matrix calculation by the matrix calculation unit 2 in the second embodiment. In this case, unlike the example illustrated in FIG. 24, each of the multiplexers 36#1, 35#2, 36#3, and 36#4 reads the data from the FIFO 35#5, and a data portion amounting to ¼ of the read data is written into each of the FIFOs 35#1, 35#2, 35#3, and 35#4. The FIFOs 35#1, 35#2, 35#3, and 35#4 are pushed when one data is written.

The load and store units 20#1, 20#2, 20#3, 20#4 may form an example of a plurality of first data input and output parts, and the FIFOs 35#1, 35#2, 35#3, and 35#4 may form an example of a plurality of first data storage parts. In addition, the FIFO 35#5 may form an example of a second data storage part, and the load and store unit 20#5 may form an example of a second data input and output part. The multiplexers 36#1, 36#2, 36#3, and 36#4 may form an example of a data distributing part.

Conclusion

As described above, the matrix calculation unit 2 in this embodiment may have the function to mutually convert between the data array suited for the 2×2 matrix operation and the data array suited for the 4×4 matrix operation, and thus, the matrix operation may be performed efficiently.

Third Embodiment

Next, a description will be given of a matrix calculation unit 3 in a third embodiment of the present invention, by referring to FIGS. 26 and 27. The matrix calculation unit 3 in this embodiment may mutually convert between the data array suited for the 2×2 matrix operation and the data array suited for the 4×4 matrix operation, using a structure different from that of the first embodiment. Accordingly, a description will be given of parts of this embodiment that are different from the first embodiment.

Figure 26:
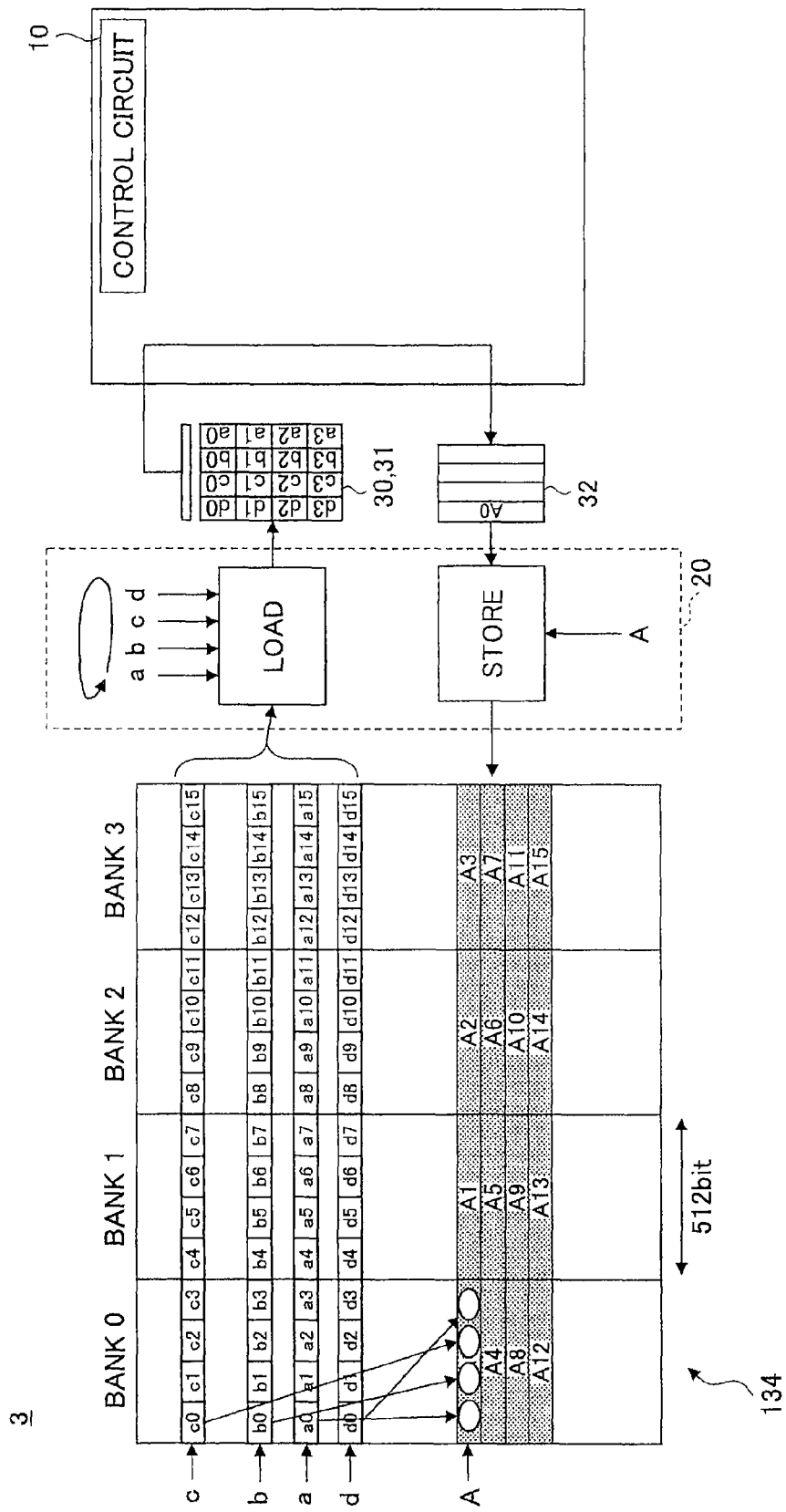
FIG. 26 is a diagram for illustrating a process of converting a data array for 2×2 matrix calculation into a data array for 4×4 matrix calculation by the matrix calculation unit in a third embodiment.

FIG. 26 is a diagram for illustrating a process of converting a data array for 2×2 matrix calculation into a data array for 4×4 matrix calculation by the matrix calculation unit 3 in the third embodiment. In the matrix calculation unit 3 in this embodiment, the FIFOs 30 and 31 may include a function to sort by interchanging the row direction and the column direction.

Figure 27:
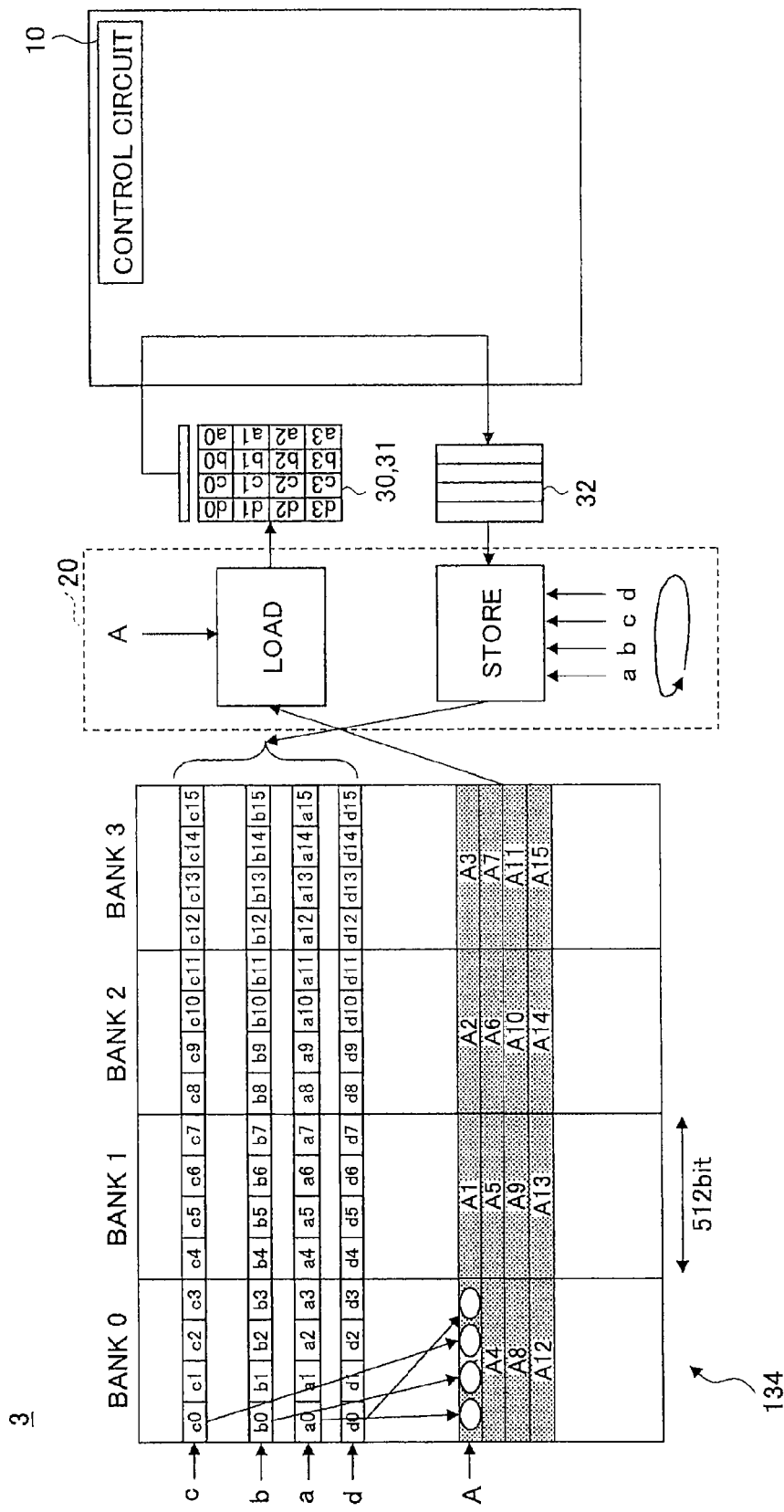
FIG. 27 is a diagram for illustrating a process of converting a data array for 4×4 matrix calculation into a data array for 2×2 matrix calculation by the matrix calculation unit in the third embodiment.

FIG. 27 is a diagram for illustrating a process of converting a data array for 4×4 matrix calculation into a data array for 2×2 matrix calculation by the matrix calculation unit 3 in the third embodiment.

CONCLUSION

As described above, the matrix calculation unit 3 in this embodiment may have the function to mutually convert between the data array suited for the 2×2 matrix operation and the data array suited for the 4×4 matrix operation, and thus, the matrix operation may be performed efficiently.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

For example, in each of the embodiments described above, the matrix calculation unit includes the function to mutually convert between the data array suited for the 2×2 matrix operation and the data array suited for the 4×4 matrix operation. However, this function may mutually convert between the data arrays suited for matrix operations of matrices having arbitrary sizes.

What is claimed is:

1. A matrix calculation unit comprising:
a matrix operation unit including a function to perform a matrix operation of a first size with respect to data stored in a memory, and a function to perform a matrix operation of a second size with respect to the data stored in the memory, wherein the second size is enlarged from the first size; and
a converting unit configured to convert in at least one direction in the memory between a data array suited for the matrix operation of the first size and a data array suited for the matrix operation of the second size.

2. The matrix calculation unit as claimed in claim 1, wherein matrix elements forming a matrix of the first size maintain a format of the matrix of the first size in the data array suited for the matrix operation of the second size.

3. The matrix calculation unit as claimed in claim 1, wherein
the data array suited for the matrix operation of the first size include a plurality of sets of data arrays to be consecutively processed by a stream process and stored in parallel in the memory, and
the converting unit reads a series of data in an order from the plurality of sets of data arrays stored in the memory and stores the series of data in a data storage part to generate matrix data in the data storage part, and reads data obtained by interchanging a row direction and a column direction of the matrix data when reading the matrix data from the storage part to write the read data in the memory, in order to convert the data array suited for the matrix operation of the first size into the data array suited for the matrix operation of the second size.

4. The matrix calculation unit as claimed in claim 3, wherein
the memory includes a plurality of data regions accessible in parallel, and
the converting unit includes a plurality of data storage parts that are switched every time data corresponding to a matrix of the second size are stored are stored in the plurality of data storage parts from the memory.

5. The matrix calculation unit as claimed in claim 1, wherein
the data array suited for the matrix operation of the first size include a plurality of sets of data arrays to be consecutively processed by a stream process and stored in parallel in the memory, and
the converting unit reads a plurality of series of data included in the data array suited for the matrix operation of the second size and stores the plurality of series of data in a data storage part to generate matrix data in the data storage part, and reads data obtained by interchanging a row direction and a column direction of the matrix data when reading the matrix data from the storage part to distributively write the read data in regions where the plurality of sets of data arrays are stored in the memory, in order to convert the data array suited for the matrix operation of the second size into the data array suited for the matrix operation of the first size.

6. The matrix calculation unit as claimed in claim 5, wherein
the memory includes a plurality of data regions accessible in parallel, and
the converting unit includes a plurality of data storage parts that are switched every time data corresponding to a matrix of the second size are stored are stored in the plurality of data storage parts from the memory.

7. The matrix calculation unit as claimed in claim 1, wherein
the data array suited for the matrix operation of the first size include a plurality of sets of data arrays to be consecutively processed by a stream process and stored in parallel in the memory, and
the converting unit includes
a plurality of data input and output parts provided in correspondence with the plurality of sets of data arrays;
a plurality of data extracting parts configured to extract and output parts of a series of data read from the plurality of sets of data arrays by the plurality of data input and output parts; and
a data storage part configured to store, as the data array suited for the matrix operation of the second size, a combination of the parts of the series of data extracted by the plurality of data extracting parts,
wherein the data array suited for the matrix operation of the first size is converted into the data array suited for the matrix operation of the second size.

8. The matrix calculation unit as claimed in claim 1, wherein
the data array suited for the matrix operation of the first size include a plurality of sets of data arrays to be consecutively processed by a stream process and stored in parallel in the memory, and
the converting unit includes
a plurality of first data input and output parts provided in correspondence with the plurality of sets of data arrays;
a plurality of first data storage parts provided in correspondence with the plurality of first data input and output parts;
a second data storage part provided in correspondence with the data array suited for the matrix operation of the second size;
a second data input and output part provided in correspondence with the data array suited for the matrix operation of the second size; and
a data distributing part configured to write in the plurality of first data storage parts, in response to receiving a part of data corresponding to each data array amongst a series of data read by the second data input and output part, the part of the data for every unit of data forming the plurality of sets of data arrays,
wherein the data array suited for the matrix operation of the second size is converted into the data array suited for the matrix operation of the first size.

* * * * *

UNITED STATES PATENT AND TRADEMARK OFFICE
CERTIFICATE OF CORRECTION

| | | |
|---|---|---|
| PATENT NO. | : 9,069,716 B2 | Page 1 of 1 |
| APPLICATION NO. | : 13/778843 | |
| DATED | : June 30, 2015 | |
| INVENTOR(S) | : Yi Ge et al. | |

It is certified that error appears in the above-identified patent and that said Letters Patent is hereby corrected as shown below:

In the Claims

Claim 4, Column 13, Line 43

Delete "are stored are stored" and insert --are stored--, therefor.

Claim 6, Column 14, Line 9

Delete "are stored are stored" and insert --are stored--, therefor.

Signed and Sealed this
Thirteenth Day of October, 2015

Michelle K. Lee
*Director of the United States Patent and Trademark Office*